(12) United States Patent
Enomura

(10) Patent No.: US 8,889,885 B2
(45) Date of Patent: Nov. 18, 2014

(54) METHOD FOR PRODUCING NANOPARTICLES

(75) Inventor: Masakazu Enomura, Izumi (JP)

(73) Assignee: M. Technique Co., Ltd., Osaka (JP)

( * ) Notice: Subject to any disclaimer, the term of this patent is extended or adjusted under 35 U.S.C. 154(b) by 38 days.

(21) Appl. No.: 13/520,239

(22) PCT Filed: Feb. 1, 2011

(86) PCT No.: PCT/JP2011/052053
§ 371 (c)(1),
(2), (4) Date: Jul. 2, 2012

(87) PCT Pub. No.: WO2011/096401
PCT Pub. Date: Aug. 11, 2011

(65) Prior Publication Data
US 2012/0283447 A1    Nov. 8, 2012

(30) Foreign Application Priority Data

Feb. 3, 2010    (JP) .................................. 2010-022449

(51) Int. Cl.
*B82Y 40/00* (2011.01)
*C07D 487/04* (2006.01)
*B01D 9/00* (2006.01)
*C09B 67/10* (2006.01)
*C09B 67/48* (2006.01)

(52) U.S. Cl.
CPC ............ *B01D 9/0013* (2013.01); *B01D 9/0031* (2013.01); *C09B 67/0014* (2013.01); *C09B 67/003* (2013.01)
USPC ....................................................... 548/453

(58) Field of Classification Search
None
See application file for complete search history.

(56) References Cited

U.S. PATENT DOCUMENTS

| 2010/0009214 A1 | 1/2010 | Sato et al. |
| 2010/0155310 A1 | 6/2010 | Enomura |
| 2010/0215958 A1 | 8/2010 | Enomura |

FOREIGN PATENT DOCUMENTS

| JP | 09-221616 A | 8/1997 |
| JP | 2001-264528 A | 9/2001 |
| JP | 2004-049957 A | 2/2004 |
| JP | 2008-024873 A | 2/2008 |
| WO | WO 2008/044519 A1 | 4/2008 |
| WO | WO 2009/008388 A1 | 1/2009 |
| WO | WO 2009/008393 A1 | 1/2009 |
| WO | WO 2009/038008 A1 | 3/2009 |
| WO | WO 2009/081930 A1 | 7/2009 |

*Primary Examiner* — Nyeemah A Grazier
(74) *Attorney, Agent, or Firm* — Birch, Stewart, Kolasch & Birch, LLP

(57) ABSTRACT

A method for producing a nanoparticle to separate a diketopyrrolopyrrole pigment includes separating an α-type diketopyrrolopyrrole pigment nanoparticle having high crystallinity by carrying out separation of the diketopyrrolopyrrole pigment and crystal type transformation to the α-type with substantially a single step. The α-type diketopyrrolopyrrole pigment nanoparticle is separated by mixing a diketopyrrolopyrrole pigment solution having the diketopyrrolopyrrole pigment dissolved in a solvent and an alcohol solvent containing an alcohol compound solvent in a thin film fluid formed between at least two processing surfaces 1 and 2 arranged to be opposite to each other so as to be able to approach to and separate from each other, at least one of which rotates relative to the other. An acidic substance is contained in at least any one of the diketopyrrolopyrrole pigment solution and the alcohol solvent at this moment.

11 Claims, 18 Drawing Sheets

(A)

(B)

(A)

(B)

METHOD FOR PRODUCING NANOPARTICLES

TECHNICAL FIELD

The present invention relates to a method for producing nanoparticles.

BACKGROUND ART

Microparticles, in particular, nanoparticles whose particle diameter is less than 1 µm (nanosized fine particles) exhibit new characteristics that are different from those of particles, and therefore, a new method for industrially producing nanoparticles is keenly urged.

The applicant of the present invention provided a method for separating nanoparticles by stirring and instantaneously uniform mixing of a plurality of fluids in a microscopic flow path, based on a totally new concept of "microchemical process technology" that solved subjects and problems in the conventional "microchemical process technology", more specifically by using the principle based on the apparatus shown in Patent Document 1, which was filed by the applicant of the present invention (Patent Document 2). This apparatus utilizes the principle of a mechanical seal, wherein a forced thin film of a fluid to be processed is formed between processing surfaces capable of approaching to and separating from each other and being displaced relative to the other thereby supplying the fluid to be processed into between the rotating processing surfaces, whereby realizing a minute distance between the processing surfaces by the pressure balance between the supply pressure of the fluid and the pressure exerted between the rotating processing surfaces. In a method used before the method based on the foregoing principle, the distance between the processing surfaces was controlled mechanically or the like; therefore heat generated by rotation, deformation caused by it, axial run-out, or the like could not be absorbed, and thus it was practically impossible to make the distance between the processing surfaces minute, at least to the level of 10 µm or less. In other words, by using the principle of the apparatus shown in Patent Document 1, separation of nanoparticles by an instantaneous chemical reaction, physical chemical reaction, or the like in a microscopic flow path could be realized; and as a result of the extensive investigation of the inventors of the present application, an instantaneous stirring/mixing/reaction/separation in a microscopic flow path with the size of not only 1 mm or less but also surprisingly 0.1 µm to 10 µm could be realized.

By using the method for producing pigment nanoparticles proposed in Patent Document 2, nanosized pigments can be produced at a low cost and a low energy; nevertheless, a method for producing nanoparticles having a further smaller particle diameter and being capable of further easier re-dispersion has been wanted. In addition, control of a particle size thereof has been difficult. Accordingly, a method for producing nanoparticles having an intended particle diameter and being capable of further easier re-dispersion has been wanted.

A diketopyrrolopyrrole pigment, classified into, in accordance with the Color Index number, Pigment Orange 71, Pigment Orange 73, Pigment Red 254, Pigment Red 255, Pigment Red 264, and so on, is an organic pigment which is excellent especially in durability such as weather resistance, light resistance, and heat resistance.

The diketopyrrolopyrrole pigment, known to generally have an α-type and a β-type in its crystal structure, is frequently used mainly for a red color filter centered on Pigment Red 254. It is natural that further finer particles are wanted; and on top of it, a method for producing α-type diketopyrrolopyrrole pigment nanoparticles having further improved solvent resistance and durability is wanted, because these particles have a problem such as crystal growth in a solvent, during coating thereof, and the like, depending on the crystal type and the crystallinity thereof.

As to the method for producing the α-type diketopyrrolopyrrole pigment nanoparticles, a method comprising two steps, namely a first step in which diketopyrrolopyrrole pigment particles are separated and a second step in which a crystal type of the separated diketopyrrolopyrrole pigment particles is transformed in an organic solvent being capable of transforming the crystal type thereof, has been known, as described in Patent Document 3 or Patent Document 4. However, because crystal growth of the pigment particles occurs inevitably in the step of crystal type transformation, it is difficult to keep a particle diameter fine; and thus, it is difficult to provide nanoparticles having a uniform particle diameter and a spherical shape.

In addition to the above-mentioned method, a so-called solvent salt milling method, in which a mixture of an α-type and a β-type diketopyrrolopyrrole pigment is milled by wet grinding in an organic solvent by using an inorganic salt such as sodium chloride as a triturating agent, has been known, as described in Patent Document 5. In this method, crystal type transformation accompanied with crystal growth is effected in parallel with pulverization by milling.

However, when a method including the milling step as described in Patent Document 5 is used to control a crystal type of the pigment nanoparticles, there has been a problem that characteristics expected for the pigment nanoparticles, such as color tone, transparency, spectral property, and durability, are not expressed, because strong force acts on the pigment nanoparticles (crystal), as described in Patent Document 3.

The applicant of the present invention had provided a method for producing pigment nanoparticles wherein a pigment substance is separated in a thin film fluid passing through between processing surfaces arranged to be opposite to each other, as described in Patent Document 2; but the method to produce an α-type diketopyrrolopyrrole was not specifically disclosed therein. Accordingly, inventors of the present application attempted to separate the α-type diketopyrrolopyrrole in a thin film fluid containing a diketopyrrolopyrrole pigment solution containing at least one kind of diketopyrrolopyrrole pigments dissolved in a solvent and an alcohol solvent containing at least one kind of alcohol compound solvent by using the method for producing pigment nanoparticles described in Patent Document 2. However, in this method, it was difficult to separate the α-type diketopyrrolopyrrole pigment nanoparticles having high crystallinity, and in addition, there was a case that a mixture of the α-type with other crystal type (β-type) was obtained; and thus, the diketopyrrolopyrrole pigment nanoparticles substantially comprising only the α-type could not be produced efficiently.

Patent Document 1: JP-A-2004-49957
Patent Document 2: International Patent Laid-Open Publication No. 2009/008388
Patent Document 3: International Patent Laid-Open Publication No. 2008/044519
Patent Document 4: International Patent Laid-Open Publication No. 2009/081930
Patent Document 5: JP-A-2008-24873

DISCLOSURE OF INVENTION

Problems to be Solved by the Invention

In view of the above-mentioned, the present invention has an object to produce uniform and fine nanoparticles.

In addition, in view of the above-mentioned, the present invention has an object to control a particle diameter of separating nanoparticles.

Further, the present invention is intended to solve the problems mentioned above; and thus, an object thereof is to provide a method for producing α-type diketopyrrolopyrrole pigment nanoparticles. In particular, the present invention intends to separate α-type diketopyrrolopyrrole pigment nanoparticles having high crystallinity by carrying out separation of the diketopyrrolopyrrole pigment and crystal type transformation to the α-type with substantially a single step. Desirably, the present invention intends to provide a method for producing nanoparticles with which the diketopyrrolopyrrole pigment nanoparticles substantially comprising only the α-type is obtained.

Means for Solving the Problems

Inventors of the present invention carried out an extensive investigation to solve the problems mentioned above; and as a result, in the method for producing nanoparticles by using the apparatus used in the Patent Document 2 wherein the nanoparticles are separated by converging at least two kinds of fluids between at least two processing surfaces capable of approaching to and separating from each other and rotating relative to the other, the inventors found that even further finer and more uniform nanoparticles than ever could be produced when these two kinds of fluids for separating the nanoparticles were made to have temperature difference therebetween. Based on this finding, the present invention could be accomplished.

Inventors of the present invention carried out an extensive investigation further. As a result, in the method for producing nanoparticles by using the apparatus used in the Patent Document 2 wherein the nanoparticles are separated by converging at least two kinds of fluids between at least two processing surfaces capable of approaching to and separating from each other and rotating relative to the other, the inventors found, by controlling temperature difference between the two kinds of fluids for separating the nanoparticles, that even further finer and more uniform microparticles than ever could be produced and that a particle diameter of the separating nanoparticles could be controlled. In addition, the inventors found, by further increasing dissolved concentration of a microparticle material in a microparticle material solution, that even further finer and more uniform nanoparticles than ever could be produced and that a particle diameter of the separating nanoparticles could be controlled. Based on these findings, the present invention could be accomplished.

Further in addition, the inventors of the present invention found, as a result of an extensive investigation, that at the time during a diketopyrrolopyrrole pigment was separated by mixing a diketopyrrolopyrrole solution containing a diketopyrrolopyrrole pigment dissolved therein with an alcohol solvent between at least two processing surfaces arranged opposite to each other so as to be able to approach to and separate from each other, at least one of which rotates relative to the other, if at least any one of the diketopyrrolopyrrole pigment solution and the alcohol solvent was made to contain an acidic substance, substantially only the α-type diketopyrrolopyrrole pigment nanoparticles could be obtained without substantially separating the β-type diketopyrrolopyrrole pigment. Based on this finding, the present invention could be accomplished.

An aspect of the present invention according to claim 1 is to provide a method for producing nanoparticles,
wherein, at least two kinds of fluids to be processed are used,
wherein, at least one of the fluids is a diketopyrrolopyrrole pigment solution containing at least one kind of diketopyrrolopyrrole pigment dissolved therein and at least one of the fluids other than the above-mentioned is an alcohol solvent containing at least one kind of alcohol compound solvent,
wherein, the fluids to be processed are mixed to separate the diketopyrrolopyrrole pigment thereby providing the method for producing the nanoparticles, wherein:
of the diketopyrrolopyrrole pigment solution and the alcohol solvent, at least any one of the fluids to be processed contains an acidic substance, and
the diketopyrrolopyrrole pigment solution and the alcohol solvent, both of them being as the fluids to be processed, are mixed in a thin film fluid formed between at least two processing surfaces arranged opposite to each other so as to be able to approach to and separate from each other, at least one of which rotates relative to the other, thereby separating the diketopyrrolopyrrole pigment.

An aspect of the present invention according to claim 2 is to provide a method for producing nanoparticles, wherein:
at least three kinds of fluids to be processed, comprising a first fluid, a second fluid, and a third fluid, are used,
wherein, the first fluid is a diketopyrrolopyrrole pigment solution containing at least one kind of diketopyrrolopyrrole pigment dissolved therein,
the second fluid is an alcohol solvent containing at least one kind of alcohol compound solvent, and
the third fluid contains an acidic substance,
wherein, the fluids to be processed are mixed in a thin film fluid formed between at least two processing surfaces arranged opposite to each other so as to be able to approach to and separate from each other, at least one of which rotates relative to the other, thereby separating the diketopyrrolopyrrole pigment.

An aspect of the present invention according to claim 3 is to provide the method for producing nanoparticles according to claim 1 or 2, wherein pH of a mixed solution obtained by mixing the fluids to be processed in the thin film fluid is 7 or lower.

An aspect of the present invention according to claim 4 is to provide the method for producing nanoparticles according to claim 1 or 2, wherein:
of the fluids to be processed, at least any one of the fluids is passed through between both the processing surfaces with forming the thin film fluid,
wherein, the method comprises;
another separate introduction path independent of the flow path through which the said at least any one of the fluids is passed, and
an opening leading to the separate introduction path and being arranged in at least any one of the two processing surfaces,
wherein, at least one fluid other than the said at least anyone of the fluids is introduced into between the processing surfaces from the opening so as to mix the entire fluids to be processed in the thin film fluid to effect the separation under a condition of a laminar flow in the thin film fluid,
whereby substantially only α-type diketopyrrolopyrrole pigment nanoparticles are separated without substantially separating a β-type diketopyrrolopyrrole pigment.

An aspect of the present invention according to claim 5 is to provide the method for producing nanoparticles according to claim 1 or 2, wherein the method comprises:
a fluid pressure imparting mechanism for imparting pressure to a fluid to be processed, a first processing member provided with a first processing surface of the two processing surfaces and a second processing member provided with a second processing surface of the two processing surfaces, and a rotation drive mechanism for rotating these processing members relative to each other, wherein, of the first and second processing members, at least the second processing member is provided with a pressure-receiving surface, and at least part of the pressure-receiving surface is comprised of the second processing surface, wherein, this pressure-receiving surface receives pressure applied to the fluid to be processed by the fluid pressure imparting mechanism thereby generating force to move in the direction of separating the second processing surface from the first processing surface, wherein, a fluid to be processed containing any one of the diketopyrrolopyrrole pigment solution and the alcohol solvent is passed between the first processing surface and the second processing surface, whereby the fluid to be processed is passed through between the both processing surfaces with forming a thin film fluid, wherein, the method comprises:

another separate introduction path independent of the flow path through which the said at least any one of the fluids to be processed is passed, and at least one opening leading to the introduction path in at least any one of the first and second processing surfaces, wherein, a fluid to be processed containing any other one of the diketopyrrolopyrrole pigment solution and the alcohol solvent is introduced into between the both processing surfaces from the introduction path so that the fluids to be processed may be mixed in the thin film fluid formed between the both processing surfaces to separate under a condition of a laminar flow in the thin film fluid, whereby substantially only α-type diketopyrrolopyrrole pigment nanoparticles are separated without substantially separating a β-type diketopyrrolopyrrole pigment.

An aspect of the present invention according to claim 6 is to provide the method for producing nanoparticles according to claim 1 or 2, wherein a particle diameter of the separating diketopyrrolopyrrole pigment nanoparticles is controlled by controlling processing temperature of the fluid to be processed.

An aspect of the present invention according to claim 7 is to provide a method for producing nanoparticles, wherein:

at least two kinds of fluids to be processed are used, wherein, at least one of the fluids to be processed is a microparticle material solution that dissolves the microparticle material in a solvent capable of being a good solvent of the microparticle material and at least one of the fluids to be processed other than the above microparticle material solution is a solvent capable of being a poor solvent of the microparticle material, wherein, the microparticle material solution and the solvent capable of being a poor solvent converge in a thin film fluid formed between at least two processing surfaces arranged to be opposite to each other so as to be able to approach to and separate from each other, at least one of which rotates relative to the other, thereby separating the nanoparticles, wherein, the nanoparticle material solution and the solvent capable of being a poor solvent have a temperature difference of 5° C. or more at least at the moment of the convergence.

An aspect of the present invention according to claim 8 is to provide a method for producing nanoparticles, wherein:

at least two kinds of fluids to be processed are used, wherein, at least one of the fluids to be processed is a microparticle material solution that dissolves the microparticle material in a solvent capable of being a good solvent of the microparticle material and at least one of the fluids to be processed other than the above microparticle material solution is a solvent capable of being a poor solvent of the microparticle material, wherein, the microparticle material solution and the solvent capable of being a poor solvent converge in a thin film fluid formed between at least two processing surfaces arranged to be opposite to each other so as to be able to approach to and separate from each other, at least one of which rotates relative to the other, thereby separating the nanoparticles, wherein, a temperature difference between the microparticle material solution and the solvent capable of being a poor solvent is controlled by a temperature difference control mechanism, wherein, the respective fluids to be processed having the temperature difference thus controlled are introduced into between the processing surfaces, wherein, in the temperature difference control mechanism, at least one of the fluid to be processed is heated or cooled.

Effects of Invention

The present invention relates to a method for producing microparticles, wherein a microparticle material solution and a solvent capable of being a poor solvent converge in a thin film fluid formed between processing surfaces arranged to be opposite to each other so as to be able to approach to and separate from each other, at least one of which rotates relative to the other, wherein the microparticle material solution and the solvent capable of being a poor solvent have a temperature difference of 5° C. or more at the moment of separating the microparticles by converging the microparticle material solution and the solvent capable of being a poor solvent in the thin film fluid. By doing so, it became possible to produce even further finer and uniform microparticles than ever.

In addition, the present invention relates to a method for producing microparticles, wherein a microparticle material solution and a solvent capable of being a poor solvent converge in a thin film fluid formed between processing surfaces arranged to be opposite to each other so as to be able to approach to and separate from each other, at least one of which rotates relative to the other, wherein, at the moment of separating the microparticles by converging the microparticle material solution and the solvent capable of being a poor solvent in the thin film fluid, a temperature difference between the microparticle material solution and the solvent capable of being a poor solvent is controlled and the respective fluids having the temperature difference thus controlled are introduced between the processing surfaces. By doing so, it became possible to control a particle diameter of the separating microparticles.

According to the present invention, separation of the diketopyrrolopyrrole pigment and crystal type transformation to the α-type can be effected with substantially a single step; and thus, the α-type diketopyrrolopyrrole pigment nanoparticles can be produced stably with lower energy and lower cost than ever. In addition, the α-type diketopyrrolopyrrole pigment nanoparticles having an intended property can be provided because the particle diameter thereof can be easily controlled.

BEST MODES FOR CARRYING OUT THE INVENTION

Hereinafter, detailed explanation will be made by referring to one example of the embodiments of the present invention; but a technical range of the present invention is not limited by the following embodiments and Examples.

The diketopyrrolopyrrole pigment used in the present invention includes, in accordance with the Color Index number, Pigment Orange 71, Pigment Orange 73, Pigment Red 254, Pigment Red 255, and Pigment Red 264, or derivatives thereof, while any one of Pigment Red 254 and its derivative or both are especially preferable.

Figure 5:
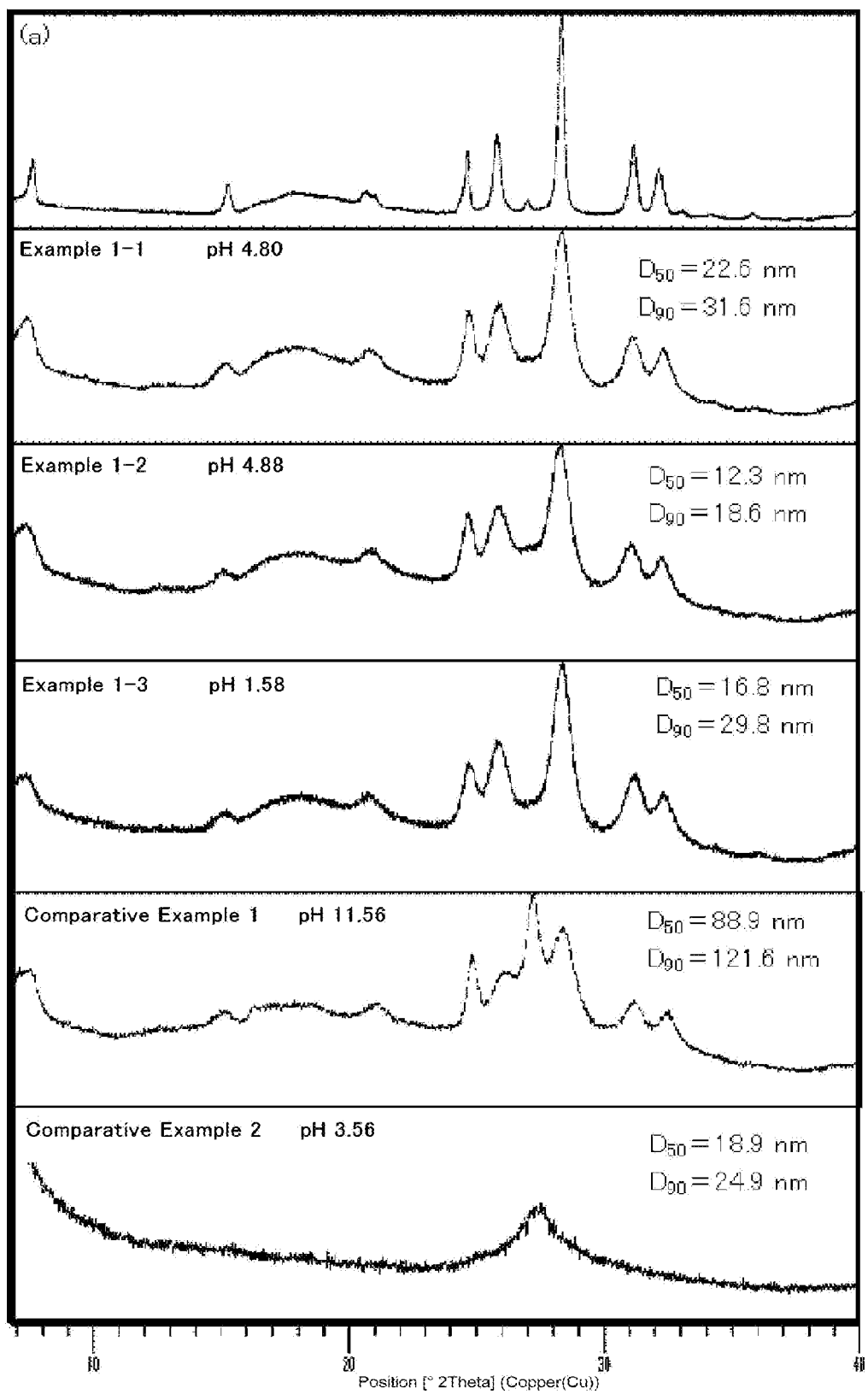
FIG. 5 shows graphs of the XRD measurement results of Examples and Comparative Examples.

The α-type diketopyrrolopyrrole pigment of the present invention is similar to a general α-type diketopyrrolopyrrole pigment; and the 2θ peaks (unit: degree) of the powder X-ray diffraction spectrum measurement(XRD), in the case of Pigment Red 254, appear at 7.5, 14.9, 17.5, 20.5, 24.7, 25.8, 28.3, 31.0, and 32.2 (FIG. 5:(a)).

The diketopyrrolopyrrole pigment solution in the present invention is not particularly limited provided that at least one kind of the diketopyrrolopyrrole pigment is dissolved or molecular-dispersed in a solvent. One example to prepare the solution is by dissolving or molecular-dispersing a commercially available or a synthesized diketopyrrolopyrrole pigment into a solvent. In another example, a metal salt solution of a diketopyrrolopyrrole pigment obtained in synthesis of a diketopyrrolopyrrole pigment may be used.

An illustrative example of the solvent to dissolve or molecular-disperse the diketopyrrolopyrrole pigment includes water, an organic solvent, or a mixed solvent comprising a plurality of them. An illustrative example of the water includes tap water, ion-exchanged water, pure water, ultrapure water, and RO water. An illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogen-containing compound solvent, an ester compound solvent, an ionic liquid, a carboxylic acid compound, and a sulfonic acid compound. These solvents may be used separately or as a mixture of a plurality of them.

In addition, the afore-mentioned solvents containing an acidic substance or a basic substance mixed or dissolved therein may be used. An illustrative example of the basic substance includes a metal hydroxide such as sodium hydroxide and potassium hydroxide; a metal alkoxide such as sodium methoxide and sodium isopropoxide; and an amine compound such as triethylamine, diethylamino ethanol, and diethylamine. An illustrative example of the acidic substance includes an inorganic acid such as hydrochloric acid, nitric acid, fuming nitric acid, sulfuric acid, and fuming sulfuric acid; and an organic acid such as formic acid, acetic acid, chloroacetic acid, dichloroacetic acid, oxalic acid, trifluoroacetic acid, and trichioroacetic acid. These basic or acidic substances may be used as a mixture with the various solvents as mentioned above, or each of the substances may be used separately.

To explain the foregoing solvents in more detail, an illustrative example of the alcohol compound solvent includes methanol, ethanol, isopropanol, n-propanol, and 1-methoxy-2-propanol; and in addition, a linear alcohol such as n-butanol; a branched alcohol such as 2-butanol and tert-butanol; a polyvalent alcohol such as ethylene glycol and diethylene glycol; and propylene glycol monomethyl ether. An illustrative example of the ketone compound solvent includes acetone, methyl ethyl ketone, and cyclohexanone. An illustrative example of the ether compound solvent includes dimethyl ether, diethyl ether, and tetrahydrofuran. An illustrative example of the aromatic compound solvent includes nitrobenzene, chlorobenzene, and dichlorobenzene. An illustrative example of the aliphatic compound solvent includes hexane. An illustrative example of the nitrile compound solvent includes acetonitrile. An illustrative example of the sulfoxide compound solvent includes dimethyl sulfoxide, diethyl sulfoxide, hexamethylenesulfoxide, and sulfolane. An illustrative example of the halogen-containing compound solvent includes chloroform, dichloromethane, trichloroethylene, and iodoform. An illustrative example of the ester compound solvent includes ethyl acetate, butyl acetate, methyl lactate, ethyl lactate, and 2-(1-methoxy)propyl acetate. An illustrative example of the ionic liquid includes a salt of 1-butyl-3-methyl imidazolium with PF6-(hexafluorophosphate ion). An illustrative example of the amide compound solvent includes N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methyl formamide, acetamide, N-methylacetamide, N,N-dimethylacetamide, N-methylpropaneamide, and hexamethylphosphoric triamide. An illustrative example of the carboxylic compound includes 2,2-dichloropropionic acid and squaric acid. An illustrative example of the sulfonic acid compound includes methanesulfonic acid, p-toluenesulfonic acid, chlorosulfonic acid, and trifluoromethane sulfonic acid.

A specific example of the alcohol solvent to separate the diketopyrrolopyrrole pigment nanoparticles by mixing thereof with the diketopyrrolopyrrole pigment solution is a solvent containing at least one alcohol compound solvent including, similar to the foregoing, a linear alcohol such as methanol, ethanol, n-propanol, and n-butanol; a branched alcohol such as isopropanol, 1-methoxy-2-propanol, 2-butanol, and tert-butanol; a polyvalent alcohol such as ethylene glycol and diethylene glycol; and propylene glycol monomethyl ether. In the present invention, an alcohol solvent containing 80% or more of the foregoing alcohol compound solvent is preferable.

In the present invention, an acidic substance is contained in at least any one of the diketopyrrolopyrrole pigment solution and the alcohol solvent. Alternatively, an acidic substance may be contained in a third fluid to be processed other than the diketopyrrolopyrrole pigment solution and the alcohol solvent mentioned above. In this case, an acidic substance may be contained in at least any one of the diketopyrrolopyrrole pigment solution and the alcohol solvent, or may not be contained in both solutions. An illustrative example of the acidic substance includes, similar to the afore-mentioned, an inorganic acid such as hydrochloric acid, nitric acid, fuming nitric acid, sulfuric acid, and fuming sulfuric acid; and an organic acid such as formic acid, acetic acid, chloroacetic acid, dichloroacetic acid, oxalic acid, trifluoroacetic acid, and trichloroacetic acid. By doing so, the α-type diketopyrrolopyrrole pigment nanoparticles having even further higher crystallinity may be separated. The third fluid to be processed may be solely the foregoing acidic substance, or a mixture or a dissolved solution obtained by mixing or dissolving the acidic substance into a solvent for dissolving or dispersing the diketopyrrolopyrrole pigment.

In the present invention, pH of the solution of mixing the diketopyrrolopyrrole pigment solution and the alcohol solvent is preferably 7 or lower; in more detail, pH of the mixed solution obtained by mixing all the fluids to be processed including the diketopyrrolopyrrole pigment solution and the alcohol solvent in a thin film fluid formed by using a fluid processing apparatus mentioned later is preferably 7 or lower. If pH is higher than 7, there are cases that a spherical nanoparticle is not formed, the obtained diketopyrrolopyrrole pigment solution contains not only the α-type but also substantially nonnegligible amount of β-type, particles thereof coarsens by crystal growth and so on as a passage of time, and the like. Therefore, it is preferable to use the acidic substance with the amount being so as to give pH of 7 or lower in the mixed solution obtained by mixing all the fluids to be processed including the diketopyrrolopyrrole pigment solution and the alcohol solvent. For pH measurement, a commercially available pH meter may be used. When a solvent in which the measurement is difficult, for example, such as, low polar toluene and xylene, is used, the measurement may be done by using a solution diluted thereof with water, an alcohol solvent, or the like.

In the present invention, it is preferable that the mixing of the diketopyrrolopyrrole pigment solution and the alcohol solvent be effected preferably by using a method wherein these fluids are stirred and mixed uniformly in a thin film fluid formed between processing surfaces arranged opposite to each other so as to be able to approach to and separate from each other, at least one of which rotates relative to the other. As to the apparatus to effect such mixing, the apparatus based on the same principle as the apparatus described in Patent Document 2 filed by applicant of the present invention may be used. By using the apparatus based on the principle like this, the diketopyrrolopyrrole pigment nanoparticles having a uniform and homogeneous spherical shape can be obtained. In addition, by changing processing temperature therein, a particle diameter of the α-type diketopyrrolopyrrole pigment nanoparticles may be easily controlled.

Hereinafter, embodiments of the above-mentioned apparatus will be explained by using the drawings.

Figure 1:
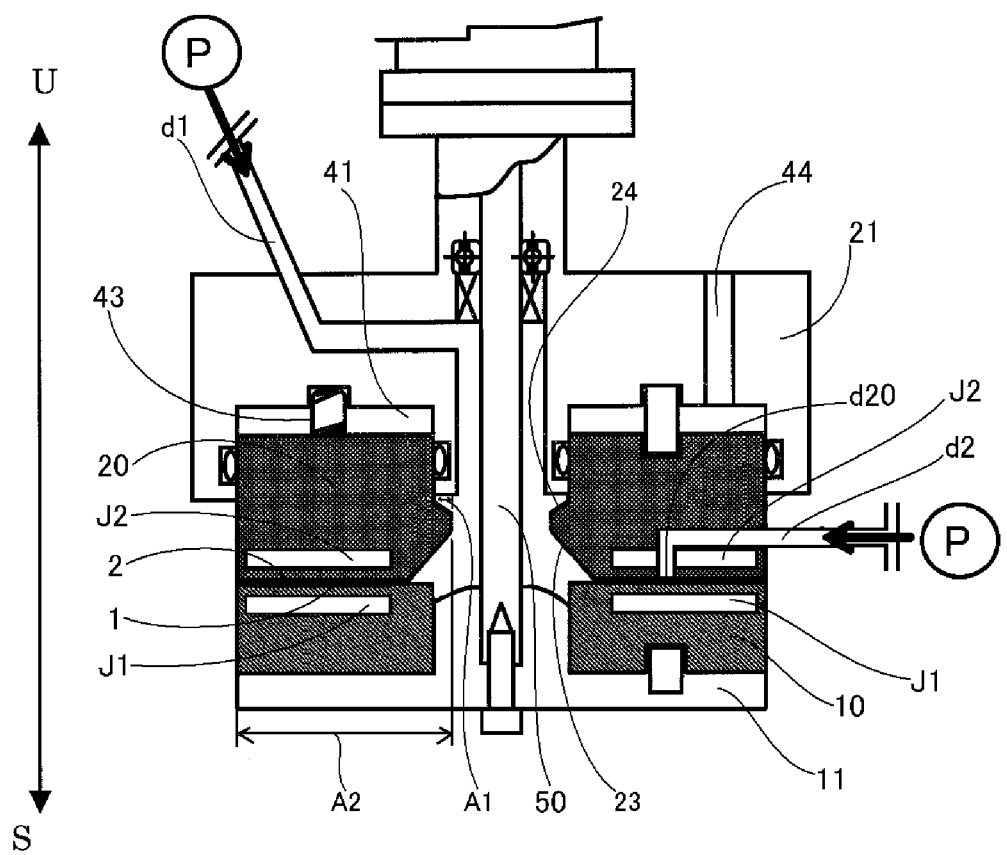
FIG. 1 is a schematic sectional view showing the fluid processing apparatus according to an embodiment of the present invention.
Figure 2:
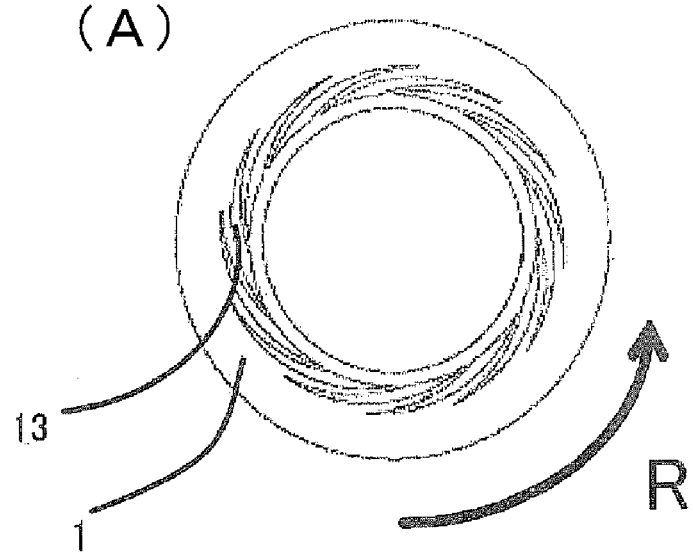
FIG. 2(A) is a schematic plane view of the first processing surface in the fluid processing apparatus shown in FIG. 1.
FIG. 2(B) is an enlarged view showing an important part of the processing surface in the apparatus.
Figure 2:
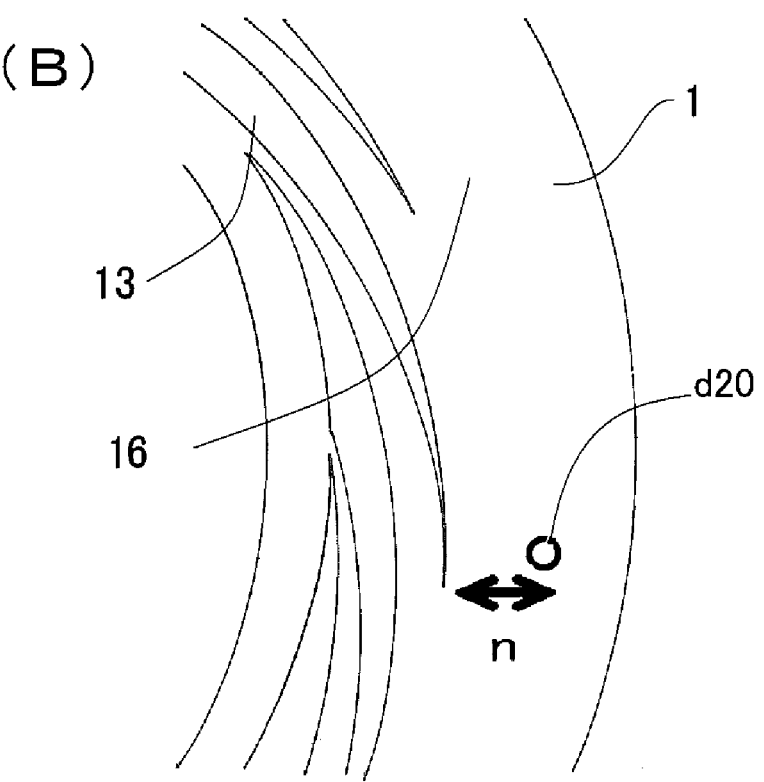
Figure 3:
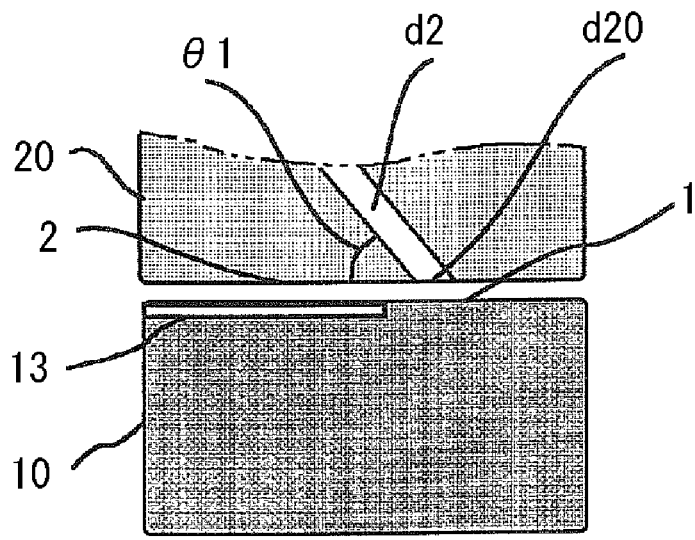
FIG. 3(A) is a sectional view of the second introduction path of the apparatus.
FIG. 3(B) is an enlarged view showing an important part of the processing surface for explaining the second introduction path.
Figure 3:
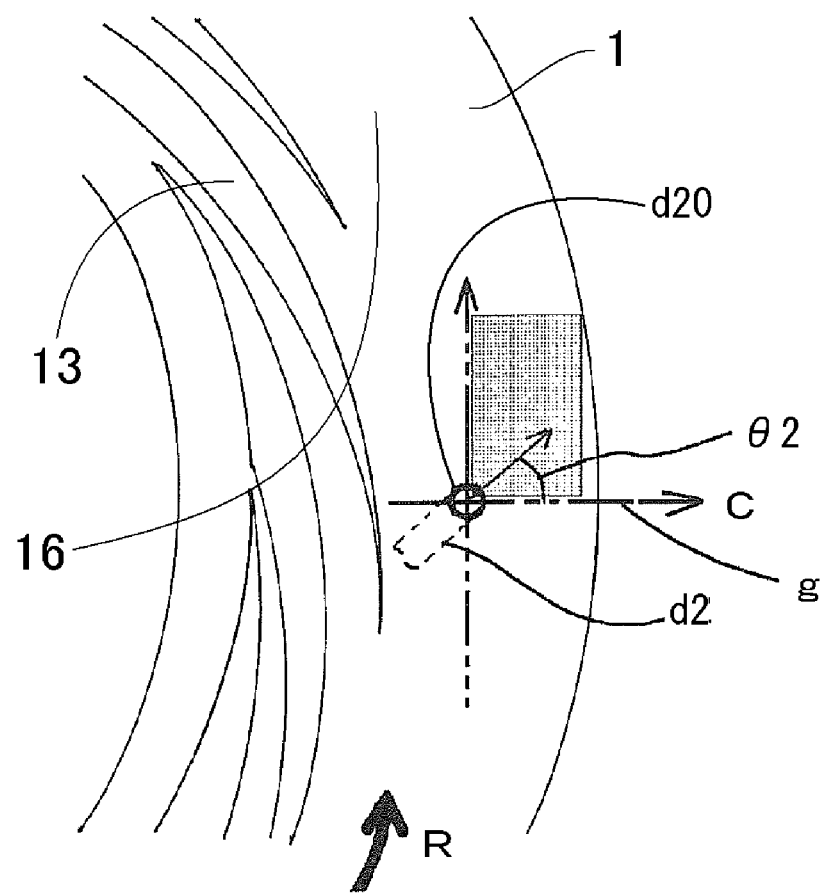

The fluid processing apparatus shown in FIG. 1 to FIG. 3 is similar to the apparatus described in Patent Document 2, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, frond and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 μm to 1 mm, or in particular 1 μm to 10 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive member, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk with a ring form. Material of the processing members 10 and 20 is not only metal but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a flow path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a flow path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism presses the first processing surface 1 of the first processing member 10 and the second processing surface 2 of the second processing member 20 in the direction to make them approach to each other, and generate a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of microvibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

The base end of the depression 13 reaches preferably inner circumference of the first processing member 10. The front end of the depression 13 extends in an outer circumferential direction of the first processing surface 1 with the depth thereof (cross-sectional area) being gradually shallower as going from the base end toward the front end.

Between the front end of the depression 13 and the outer periphery of the first processing surface 1 is arranged a flat surface 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating nanoparticles from a fluid, it is preferable that mixing of a plurality of fluids to be processed and separation of the nanoparticles therefrom be effected under the condition of a laminar flow.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening of the introduction part may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each solvent has a meaning for merely discriminating an $n^{th}$ fluid among a plurality of the solvents present; and therefore, a third or more solvents can also exist.

In the apparatus mentioned above, a reaction such as separation and deposition, or crystallization takes place under a forced and uniform mixing between the processing surfaces 1 and 2 arranged opposite to each other so as to be able to approach to and separate from each other, at least one of which rotates relative to the other, as shown in FIG. 1. A particle diameter and mono-dispersibility of the nanoparticles can be controlled by appropriately controlling rotation number of the processing members 10 and 20, fluid velocity, distance between the processing surfaces, raw material concentration, a kind of solvent, and so on.

Hereinafter, specific embodiments of the method for producing the α-type diketopyrrolopyrrole pigment nanoparticles by using the apparatus mentioned above will be explained.

In the apparatus mentioned above, a first fluid containing an alcohol solvent and a second fluid containing a diketopyrrolopyrrole pigment solution containing at least one kind of diketopyrrolopyrrole pigment dissolved therein are mixed in a thin film fluid formed between processing surfaces arranged opposite to each other so as to be able to approach to and separate from each other, at least one of which rotates relative to the other, thereby separating the α-type diketopyrrolopyrrole pigment nanoparticles. At that time, of the first fluid and the second fluid, at least any one of them contains an acidic substance.

The reaction accompanied with separation of the pigment nanoparticles takes place in the apparatus shown in FIG. 1 of the present application under a forced and uniform mixing between the processing surfaces 1 and 2 arranged opposite to each other so as to be able to approach to and separate from each other, at least one of which rotates relative to the other.

Firstly, from one flow path, i.e., from the first introduction part d1, a first fluid containing an alcohol solvent is introduced into between the processing surfaces 1 and 2 arranged opposite to each other so as to be able to approach to and separate from each other, at least one of which rotates relative to the other, whereby forming between these processing surfaces a thin film fluid of a first fluid film formed of the first fluid.

Then, from a different flow path, i.e., from the second introducing part d2, a second fluid containing a diketopyrrolopyrrole pigment solution is introduced directly into the first fluid film formed between the processing surfaces 1 and 2.

With this, the first fluid and the second fluid are mixed between the processing surfaces 1 and 2 wherein the distance therebetween is fixed by the pressure balance between the supply pressure of the fluids to be processed and the pressure exerted between the rotating processing surfaces, whereby a reaction accompanied with separation of pigment nanoparticles can be effected.

Meanwhile, because it is good enough only if the reaction could be effected between the processing surfaces 1 and 2, as opposed to the foregoing method, a method wherein the second fluid is introduced from the first introduction part d1 and the first fluid is introduced from the second introduction part d2 may also be used. That is, the expression "first" or "second" for each solvent has a meaning for merely discriminating an $n^{th}$ fluid among a plurality of the fluids present; and therefore, a third or more fluids can also exist.

It is also possible to provide the processing apparatus with a third introduction part d3 in addition to the first and second introduction parts d1 and d2 as mentioned above; in this case, for example, a fluid containing an acidic substance may be introduced into the processing apparatus separately, as the first, second, and third fluids respectively, from the respective introduction parts. By doing so, concentration and pressure of each solution can be controlled separately so that the reaction accompanied with separation and also a particle diameter of the nanoparticles can be controlled stably and more precisely. Meanwhile, a combination of the fluids to be processed (the first to third fluids) introduced into the respective introduction parts may be set arbitrarily. The same is true for the cases using introduction parts of the fourth or more; and thus, fluids to be introduced into the processing apparatus can be subdivided. In this case, the acidic substance may be contained at least in the third fluid; and the acidic substance may be contained in any one of the first fluid and the second fluid, or may not be contained in both the first and second fluids. In addition, temperature of each fluid to be processed such as the first fluid, the second fluid, and so on, or temperature differences among the first fluid, the second fluid, and so on (namely, temperature differences among respective introducing fluids to be processed) may be controlled. To control temperature or temperature difference of each introducing fluid to be processed, the processing apparatus may be provided with a mechanism with which temperature of each fluid to be processed (temperature of the processing apparatus, or more specifically temperature just before being introduced into between the processing surfaces 1 and 2) is measured so as to heat or cool each fluid to be processed that is introduced into between the processing surfaces 1 and 2.

Then, one example of other embodiments of the present invention will be explained in detail. Meanwhile, the same numeral reference is given to the identical member; and thus, a detailed explanation thereof is omitted.

Hereinafter, a specific embodiment of the method for producing nanoparticles by using the afore-mentioned apparatus will be explained.

In the apparatus described above, a first fluid containing a solvent capable of being a poor solvent to a microparticle material solution in which the microparticle material is dissolved in a good solvent to the microparticle material and a second fluid containing a microparticle material solution in which the microparticle material is dissolved are mixed in a thin film fluid formed between processing surfaces arranged to be opposite to each other so as to be able to approach to and separate from each other, at least one of which rotates relative to the other, whereby nanoparticles are separated. At that time, a temperature difference is made between the two fluids to separate the nanoparticles; and this temperature difference between the two fluids to separate the nanoparticles is controlled.

The reaction accompanied with separation of the nanoparticles takes place in the apparatus shown in FIG. 1 of the present application under a forced and uniform mixing between the processing surfaces 1 and 2 arranged opposite to each other so as to be able to approach to and separate from each other, at least one of which rotates relative to the other.

Firstly, the first fluid containing a solvent capable of being a poor solvent to the microparticle material solution in which the microparticle material is dissolved in a good solvent to the microparticle material is introduced through one flow path, i.e., the first introduction part d1, into between the processing surfaces 1 and 2 arranged to be opposite to each other so as to be able to approach to and separate from each other, at least one of which rotates relative to the other, thereby forming a thin film fluid composed of the first fluid between these processing surfaces.

Meanwhile, in the present invention, a good solvent is the one in which solubility of the microparticle material is preferably 0.1% or more by mass, more preferably 0.5% or more by mass, and still more preferably 1% or more by mass.

In the present invention, a poor solvent is the one in which solubility of the microparticle material is preferably 0.01% or less by mass, more preferably 0.005% or less by mass, and still more preferably 0.001% or less by mass.

Then, the second fluid containing the microparticle material solution in which a material to be processed, i.e., the microparticle material, is dissolved is introduced directly into the thin film fluid composed of the first fluid through another flow path, i.e., the second introduction part d2.

As described above, the first fluid and the second fluid are mixed instantaneously with maintaining a state of a thin film between the processing surfaces 1 and 2, with the distance of which being controlled by the pressure balance between the supply pressure of the fluids and the pressure exerted between the rotating processing surfaces, thereby enabling to carryout the reaction to produce the nanoparticles.

Meanwhile, because it is good enough only if the reaction could be effected between the processing surfaces 1 and 2, as opposed to the foregoing method, a method wherein the second fluid is introduced from the first introduction part d1 and the first fluid is introduced from the second introduction part d2 may also be used. That is, the expression "first" or "second" for each solvent has a meaning for merely discriminating an $n^{th}$ solvent among a plurality of the solvents present; and therefore, a third or more solvents can also exist.

Combination of the first fluid and the second fluid is not particularly limited; and thus, provided that a fluid containing the microparticle material solution and a solvent capable of being a poor solvent having a lower solubility of the microparticle material than the microparticle material solution are used, any combination thereof can be used.

The microparticle material is not particularly limited. Any material may be used provided that the material can be dissolved or molecular-dispersed in a solvent. An illustrative example of the material includes an organic or inorganic pigment, a drug, an organic material such as resin, a compound of a metal, an oxide, a hydroxide, a nitride, a boride, and a carbide, a sulfated compound, a nitric compound, and an organic or inorganic composite material.

The solvent capable of being a good solvent to dissolve the microparticle material is not particularly limited. Any solvent may be used provided that the solvent can dissolve or molecular-disperse the microparticle material. An illustrative example of the solvent includes water such as water, ion-exchanged water, and ultrapure water, an alcohol solvent, a ketone solvent, an ether solvent, an aromatic solvent, carbon disulfide, an aliphatic solvent, a nitrile solvent, a sulfoxide solvent, a halogen-containing solvent, an ester solvent, an ionic liquid, an acidic solution containing an acidic substance such as sulfuric acid, hydrochloric acid, nitric acid, trifluoroacetic acid, phosphoric acid, and butyric acid, a basic solution containing a basic substance such as sodium hydroxide, potassium hydroxide, sodium methoxide, and sodium ethoxide, or a mixed solvent of two or more of them.

The solvent capable of being a poor solvent to effect separation of the nanoparticles is not particularly limited. A solvent having lower solubility to the microparticle material than the solvent in which the microparticle material is dissolved may be used. An illustrative example of the solvent includes water, an alcohol solvent, a ketone solvent, an ether solvent, an aromatic solvent, carbon disulfide, an aliphatic solvent, a nitrile solvent, a sulfoxide solvent, a halogen-containing solvent, an ester solvent, an ionic liquid, or a mixed solvent of two or more of them.

In the present invention, a temperature difference is made between the first fluid and the second fluid, as mentioned above. Practically, the temperature difference between respective fluids is preferably 5° C. or more. This temperature difference can effect preparation of ultrafine particles. Here, the term "ultrafine particles" means particles whose diameter is 200 nm or less. The temperature difference needs to exist at the moment when at least the microparticle material solution and the poor solvent converge. Accordingly, in the present invention, control is made in order for the first fluid and the second fluid to have the temperature difference therebetween.

Here, the term "control" means the treatment to realize a predetermined temperature difference necessary to obtain the ultrafine particles by heating or cooling at least one fluid of the first fluid and the second fluid.

In the present invention, the temperature difference between the first fluid and the second fluid is controlled; and in accordance with this controlled temperature difference, a particle diameter of the nanoparticles can be controlled. Accordingly, it is possible to obtain fine particles. Here, the term "control" means the treatment to realize a predetermined temperature difference necessary to obtain the nanoparticles having an intended particle diameter (volume-average particle diameter) by heating or cooling at least one fluid of the first fluid and the second fluid. Actual temperature difference between the first fluid and the second fluid is not particularly limited; but in order to obtain especially fine particles, the difference is 5° C. or more, or preferably 25° C. or more (see FIG. 19). With this temperature difference, a particle diameter of the nanoparticles can be controlled. Meanwhile, in view of controlling the particle diameter, the case that the temperature difference between the first fluid and the second fluid is zero may exist. Here, the term "fine particles" means particles whose diameter is 500 nm or less.

Content of the foregoing "control" includes a case that "the predetermined temperature difference" realized by the foregoing treatment is not changed with time (temperature difference is kept constant with time) and a case that "the predetermined temperature difference" is changed with time (temperature difference is changed with time).

More specifically, the treatment to realize the predetermined temperature difference is effected by the following two-step approach. In the first step, each temperature of the first fluid and the second fluid is measured to obtain a temperature difference therebetween. In the second step followed thereafter, based on the temperature difference obtained in the first step, temperature of one fluid is kept unchanged while the other fluid is heated or cooled, or both of the fluids are heated or cooled (combination of heating or cooling of each fluid and a degree of heating or cooling are arbitrary), thereby realizing the predetermined temperature difference between the first fluid and the second fluid.

This treatment is generally carried out as the so-called feedback control system in which the first step and the second step are repeatedly performed. The first step and the second step may be performed continuously (without break) or intermittently with a time interval during production of the nanoparticles.

In such a case if the temperature change from each fluid's supply source to respective introduction positions into between the processing surfaces can be predicted, the fluid may be introduced into between the processing surfaces with only heating or cooling of the fluid without performing the feedback control.

Each of the introduction parts d1 and d2 of the fluid processing apparatus is not necessarily connected integrally to the fluid processing apparatus at all times; for example, a heating or cooling part C2 described below may be arranged in a movable storage tank, and, when necessary, connected to each of the introduction parts d1 and d2 of the fluid processing apparatus to introduce a heated or cooled fluid into between the processing surfaces.

The treatment in the second step is carried out, for examples, as following, based on the temperature difference between the fluids obtained in the first step. This treatment is done, for example, to keep the temperature difference of each fluid constant at a certain predetermined value at the introduction positions between the processing surfaces when the temperature difference is not changed with time, and to increase or decrease the temperature difference at the said introduction positions from a predetermined value to a different predetermined value when the temperature difference is changed with time.

1. Both the first fluid and the second fluid are heated while the temperature difference is kept constant.
2. Both the first fluid and the second fluid are cooled while the temperature difference is kept constant.
3. Temperatures of both the first fluid and the second fluid are maintained while the temperature difference is kept constant (only heating or cooling is carried out to maintain the temperatures).
4. One of the first fluid and the second fluid is heated while the other is kept unchanged or cooled so as to increase the temperature difference.

5. One of the first fluid and the second fluid is cooled while the other is kept unchanged or heated so as to increase the temperature difference.
6. One of the first fluid and the second fluid is cooled while the other is kept unchanged or heated so as to decrease the temperature difference.
7. One of the first fluid and the second fluid is heated while the other is kept unchanged or cooled so as to decrease the temperature difference.

Figure 4:
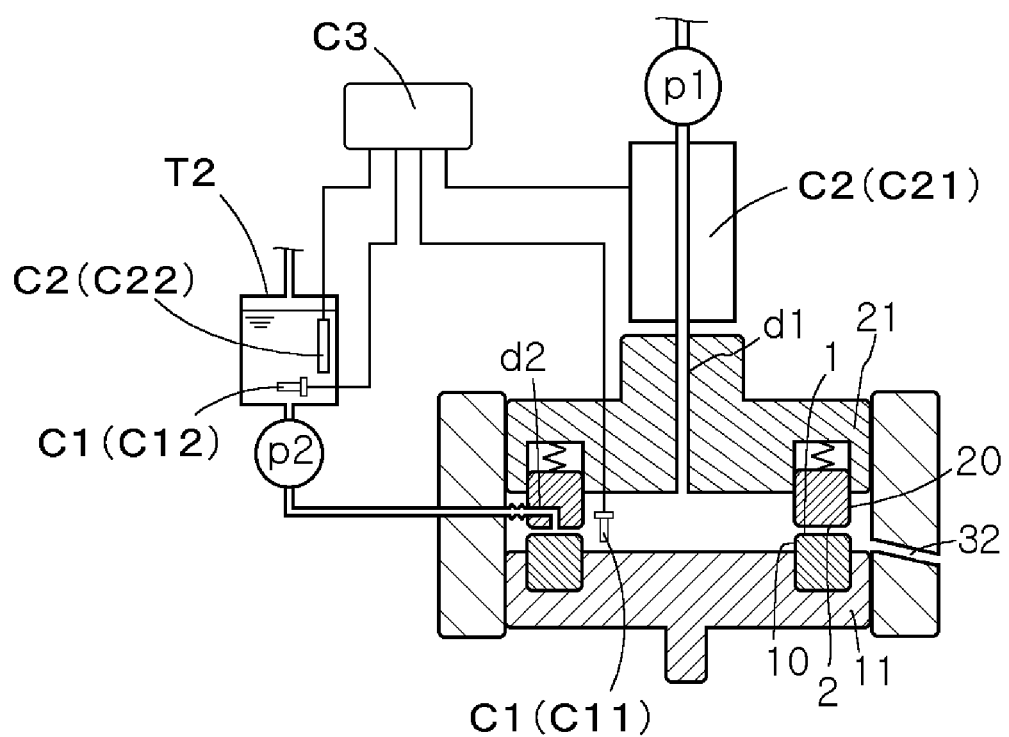
FIG. 4 is a diagram for explaining the temperature difference control mechanism in the apparatus used for carrying out the present invention.

To control the temperature difference, the fluid processing apparatus is provided with a temperature difference control mechanism as shown in FIG. 4. This temperature difference control mechanism includes a temperature measurement part C1, a heating or cooling part C2, a calculation part C3, and so on. When the feedback control is not performed as described above, only a heating or cooling part C2 may be arranged.

The temperature measurement part C1 is the part arranged, to perform the first step, in each flow path through which the respective fluids pass, and is, for example, a temperature sensor. In the embodiment shown in FIG. 4, the sensor C11 for the first fluid is arranged between each of the holders 11 and 21 in the fluid processing apparatus at the position just before introduction between the processing surfaces 1 and 2. It is connected to the second introduction part d2 in the fluid processing apparatus, and the sensor C12 for the second fluid is arranged in a tank T2 in which the second fluid is temporarily stored.

The heating or cooling part C2 is the part arranged, to perform the second step, in part of the flow path through which at least one of the afore-mentioned fluids passes, and is, for example, heating equipment such as an electric heater and a jacket for introduction of a heating medium or cooling equipment such as piping for a cooling medium. This heating or cooling part C2 is arranged in the upstream side of the each fluid's introduction position into between the processing surfaces 1 and 2. The flow path in which the temperature measurement part C1 or the heating or cooling part C2 is arranged corresponds to, for example, each introduction part d1 and d2, piping connected to the respective introduction parts d1 and d2, a pump, a valve, a storage tank, and a heat exchanger, of the fluid processing apparatus. In the embodiment shown in FIG. 4, a heat exchanger C21 is arranged in the first introduction part d1. An electric heater C22 is arranged in the tank T2 in which the second fluid is temporarily stored.

The calculation part C3 is the part to control the action of the heating or cooling part C2 upon receiving the measurement result at the temperature measurement part C1, and is, for example, a microcomputer electrically connected to the temperature measurement part C1 and the heating or cooling part C2. This calculating part C3 is provided with switches to set the temperature difference of each fluid and with a display part to display operation statuses and measured temperatures.

The temperature difference obtained in the first step is the most accurate and thus desirable if temperatures of the respective fluids are measured at the moment of convergence of the microparticle material solution with the poor solvent and the difference of respective measured temperatures is taken thereat. The convergence of the microparticle material solution with the poor solvent takes place, specifically in the fluid processing apparatus used in the present invention, at the opening of the second introduction part d2 in the processing surfaces (for example, at the opening d20 shown in FIG. 1). Accordingly, the temperature measurement is most preferably made at the opening of the second introduction part d2 in the processing surfaces.

Practically, there is a case that the temperature measurement is difficult to be made at this location. Accordingly, instead of the temperature measurement at this position, the temperature measurement may be made in, such as for example, the respective introduction parts d1 and d2 of each fluid's piping, pump, valve or storage tank, or an outlet arranged in a heat exchanger; or the temperature measurement may be made in a space between the respective holders 11 and 21 (see, FIG. 4 and so on). However, to be accurate, it is preferable that the temperature difference be evaluated considering the temperature change of each fluid from these measurement positions till the moment of convergence of the microparticle material solution with the poor solvent.

When a material having a zone in which its solubility increases with increase of the solvent temperature in its solubility curve is used as the microparticle material, for example, like a salt in water (good solvent), the actual temperature difference between the first fluid and the second fluid is obtained by using, as the poor solvent, for example, ethanol as the first fluid, and for example, salt water as the second fluid having higher temperature than ethanol.

On the other hand, when a material having a zone in which its solubility increases with decrease of the solvent temperature in its solubility curve is used as the microparticle material, for example, like calcium hydroxide ($Ca(OH)_2$) or cerium sulfate ($Ce_2(SO_4)_3$) in water (good solvent), as the poor solvent, for example, ethanol is used as the first fluid, and for example, a calcium hydroxide aqueous solution is used as the second fluid having lower temperature than ethanol.

For example, like sodium sulfate in water, there is a substance having a boundary of its maximum solubility at a specific temperature (34.4° C.), wherein it has both a zone in which its solubility increases with increase of the solvent temperature in its solubility curve (lower temperature side than this certain temperature) and a zone in which its solubility increases with decrease of the solvent temperature in its solubility curve (higher temperature side than this certain temperature). When the substance like this is used as the microparticle material, the temperature difference between the first fluid and the second fluid is determined in which zone of its solubility curve the nanoparticles are separated.

In the present invention, to control a particle diameter of the nanoparticles, it is preferable that concentration of the dissolved microparticle material contained in a good solvent solution of the microparticle material be 10 to 100%, or more preferably 50 to 98%, relative to the saturated solubility thereof. Owing to both effects, i.e., the concentration of the dissolved microparticle material in the microparticle material solution and the temperature difference between the first fluid and the second fluid, a particle diameter of the nanoparticles can be controlled.

In the present invention, firstly, in order for the first fluid and the second fluid to have the temperature difference therebetween, it is necessary that part of the flow path through which at least one of the fluids passes be provided with a mechanism for temperature change, such as, for example, a heating part such as an electric heater and a jacket to introduce a heating medium or a cooling part such as piping for a cooling medium. This flow path may correspond to, for example, each introduction part d1 and d2, piping connected to the respective introduction parts d1 and d2, a pump, a valve, and a storage tank, of the fluid processing apparatus.

In the present invention, it is desirable that the fluids be introduced into between the processing surfaces with the temperature difference of the respective fluids being kept at a constant value. For that, a structure for holding temperature may be arranged in the region from the temperature change mechanism (heating or cooling part) to the processing surfaces in the flow paths of the first fluid and the second fluid. The structure is not particularly limited, and the example of it includes covering of the flow paths with an insulation material, or installation of a heating part such as an electric heater or a cooling part such as a piping for a cooling medium. Similarly to the above-mentioned, the flow path may correspond to, for example, each introduction part d1 and d2, piping connected to the respective introduction parts d1 and d2, a pump, a valve, and a storage tank, of the fluid processing apparatus.

As to the matter that the temperature difference is kept at a constant value so that the nanoparticles having an intended particle diameter (volume-average particle diameter) may be obtained, temperature change of each fluid in the region from the heating or cooling part to the processing surfaces is suppressed preferably within the range of ±1° C., or more preferably within the range of ±0.5° C.

As described before, the processing apparatus may be provided with a third introduction part d3, in addition to the first introduction part d1 and the second introduction part d2. In this case, for example, a poor solvent, a fluid containing the microparticle material solution, a pH-controlling agent, and so on can be separately introduced into the apparatus through the respective introduction parts. By doing so, concentration and pressure of the respective fluids can be controlled separately; and thus, a reaction to produce the nanoparticles can be controlled more precisely. The same is true for the cases using introduction parts of the fourth or more; and thus, similarly to the above, fluids to be introduced into the processing apparatus can be subdivided.

EXAMPLES

Hereinafter, the present invention will be explained in more detail by Examples; but the present invention is not limited only to these Examples.

It is to be noted here that the term "from the center" in the following Examples means "from the first introduction part d1" of the fluid processing apparatus shown in FIG. 1; the first fluid means the first fluid to be processed as described before; and the second fluid means the second fluid to be processed that is introduced through the second introduction part d2 of the processing apparatus shown in FIG. 1, as described before. The term "%" here means "% by weight (wt %)".

(Powder X-ray Diffraction: XRD)

For measurement of powder X-ray diffraction, a fully automated multipurpose X-ray diffractometer (X'pert PRO MPD, manufactured by PANalytical B.V.) was used. Diffraction intensity was measured in the diffraction angle 2θ in the range of 5° to 40°.

(Particle Size Distribution)

Particle size distribution was measured by using a Nanotrac particle size distribution measurement instrument (UPA-UT151, manufactured by Nikkiso Co., Ltd.), and the values of D50 and D90 were taken.

(Transmission and Absorption Spectra)

Transmission spectrum and absorption spectrum were measured by using a UV-visible spectrophotometer (UV-2450, manufactured by Shimadzu Corporation) in the wavelength range of 350 nm to 800 nm.

Example 1-1

In Example 1-1, by using a reaction apparatus, as shown in FIG. 1, with which diffusion, stirring, and mixing are effected in a thin film fluid formed between the processing surfaces 1 and 2 arranged opposite to each other so as to be able to approach to and separate from each other, at least one of which rotates relative to the other, a diketopyrrolopyrrole pigment solution and an alcohol solvent are mixed, whereby a reaction accompanied with separation is carried out in this thin film fluid.

A mixed solution composed of 1% acetic acid and 99% methanol was introduced as a first fluid from the center into between the processing surfaces at supply pressure of 0.30 MPa, back pressure of 0.05 MPa, and a rotation speed of 1700 rpm, together with a solution containing a diketopyrrolopyrrole pigment powder (C. I. Pigment Red 254: PR254) dissolved in a mixed solvent of dimethyl sulfoxide (DMOS) with an ethanol solution containing potassium hydroxide (0.5 N—KOH in EtOH) as a second fluid (weight ratio of PR254/ 0.5 N—KOH in EtOH/DMSO being 2/10/90) at a rate of 4 mL/minute. The first fluid and the second fluid were mixed in the thin film fluid; and a dispersion solution of α-type diketopyrrolopyrrole pigment nanoparticles was discharged from the processing surfaces. The discharged dispersion solution of the pigment nanoparticles had pH of 4.80. Temperature of the respective sending fluids, i.e., the first fluid and the second fluid, measured just before the respective solutions were introduced into the processing apparatus (more precisely just before introduction between the processing surfaces 1 and 2), was 25° C. in the both fluids; and thus, the temperature difference between the respective sending fluids of the first fluid and the second fluid was 0° C. To remove impure substances from the discharged dispersion solution of the α-type diketopyrrolopyrrole pigment nanoparticles, the α-type diketopyrrolopyrrole pigment nanoparticles were loosely aggregated, and then the α-type diketopyrrolopyrrole pigment nanoparticles were spun down by using a centrifugal separator (×2150 g) as a washing process; and then, after a supernatant solution thereof was removed, the α-type diketopyrrolopyrrole pigment nanoparticles were re-dispersed by adding pure water, and then spun down again by using the centrifugal separator. After this washing process was repeated three times, a paste of the α-type diketopyrrolopyrrole pigment nanoparticles thus finally obtained was dried in a vacuum state at −0.1 MPaG and 60° C. XRD of the α-type diketopyrrolopyrrole pigment nanoparticle powder after drying was measured. The obtained α-type diketopyrrolopyrrole pigment nanoparticle powder was charged into a mixed solvent of propylene glycol monomethyl ether acetate (PGMEA) and propylene glycol monomethyl ether (PGME) (volume ratio of PGMEA/PGME being 4/1) containing therein a dissolved dispersant (Disperbyk BYK-2000, manufactured by BYK-Chemie GmbH); and then, the resulting mixture was subjected to dispersion treatment.

Example 1-2

Example 1-2 was carried out under the same conditions as Example 1-1 except only that both temperatures of the respective sending fluids, i.e., a first fluid and a second fluid, were changed to −13° C. The first fluid and the second fluid were mixed in the thin film fluid; and a dispersion solution of the α-type diketopyrrolopyrrole pigment nanoparticles was discharged from the processing surfaces. The discharged dispersion solution of the pigment nanoparticles had pH of 4.88. The temperature difference between the respective sending fluids of the first fluid and the second fluid was 0° C.

Example 1-3

Example 1-3 was carried out under the same conditions as Example 1-1 except that methanol was used as a first fluid (concentration thereof is 99.5% or higher) and a concentrated sulfuric acid solution of the diketopyrrolopyrrole pigment as a second fluid (pigment concentration of 1% by weight) and that each temperature of the sending fluids of the first fluid and the second fluid was changed to 5° C. and 35° C., respectively. A dispersion solution of the α-type diketopyrrolopyrrole pigment nanoparticles was discharged from the processing surfaces. The discharged pigment nanoparticle dispersion solution had pH of 1.58. The temperature difference between the respective sending fluids of the first fluid and the second fluid was 30° C.

Comparative Example 1

Comparative Example 1 was carried out under the same conditions as Example 1-1 except that a 70% methanol aqueous solution was used as the first fluid. A dispersion solution of the α-type diketopyrrolopyrrole pigment nanoparticles was discharged from the processing surfaces. The discharged dispersion solution of the pigment nanoparticles had pH of 11.56. The temperature difference between the respective sending fluids of the first fluid and the second fluid was 0° C.

Comparative Example 2

Comparative Example 2 was carried out under the same conditions as Example 1-1 except that a 1% acetic acid aqueous solution was used as the first fluid. A dispersion solution of the α-type diketopyrrolopyrrole pigment nanoparticles was discharged from the processing surfaces. The discharged dispersion solution of the pigment nanoparticles had pH of 3.56. The temperature difference between the respective sending fluids of the first fluid and the second fluid was 0° C.

Figure 6:
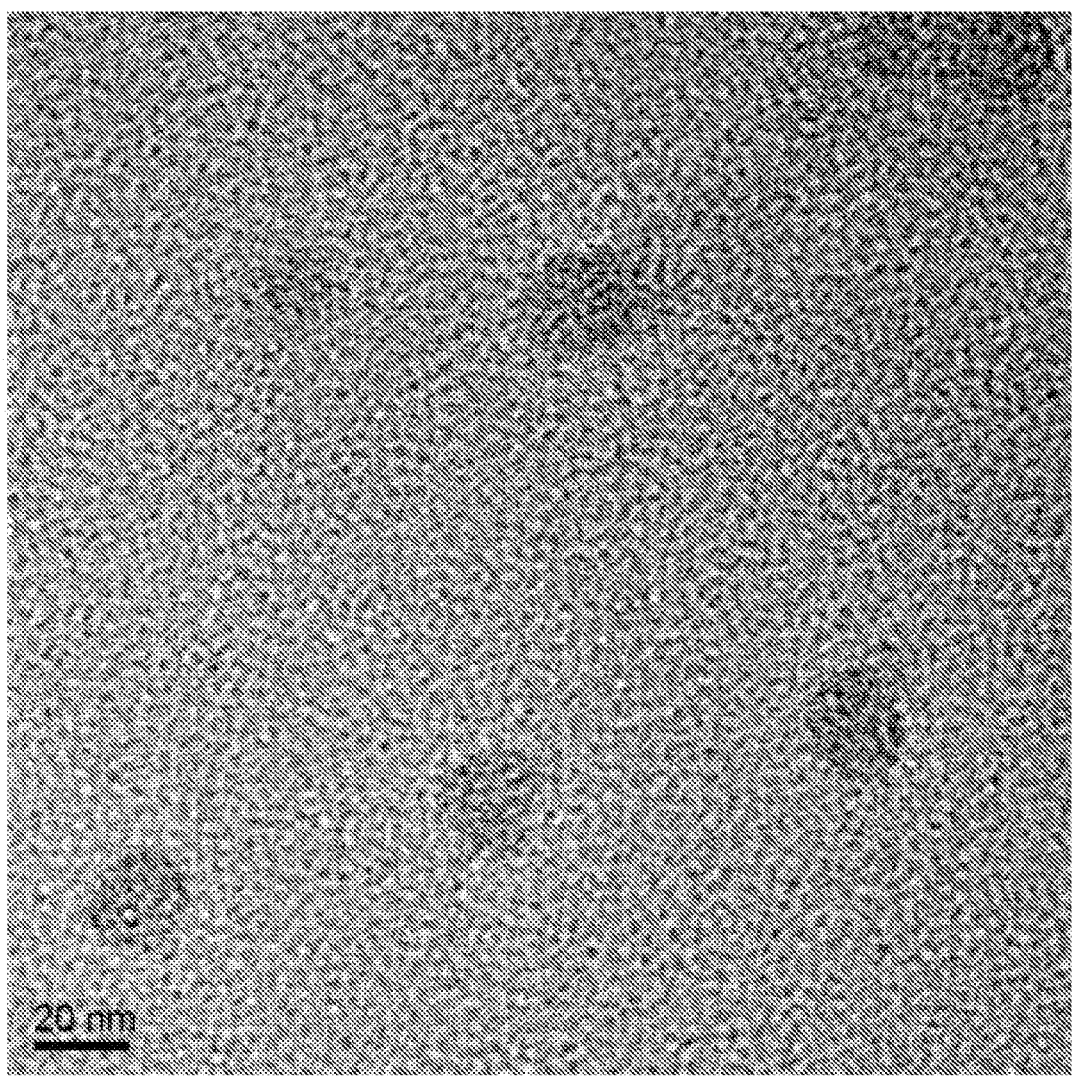
FIG. 6 is a TEM picture of the α-type diketopyrrolopyrrole pigment nanoparticles produced in Example 1-2.
Figure 7:
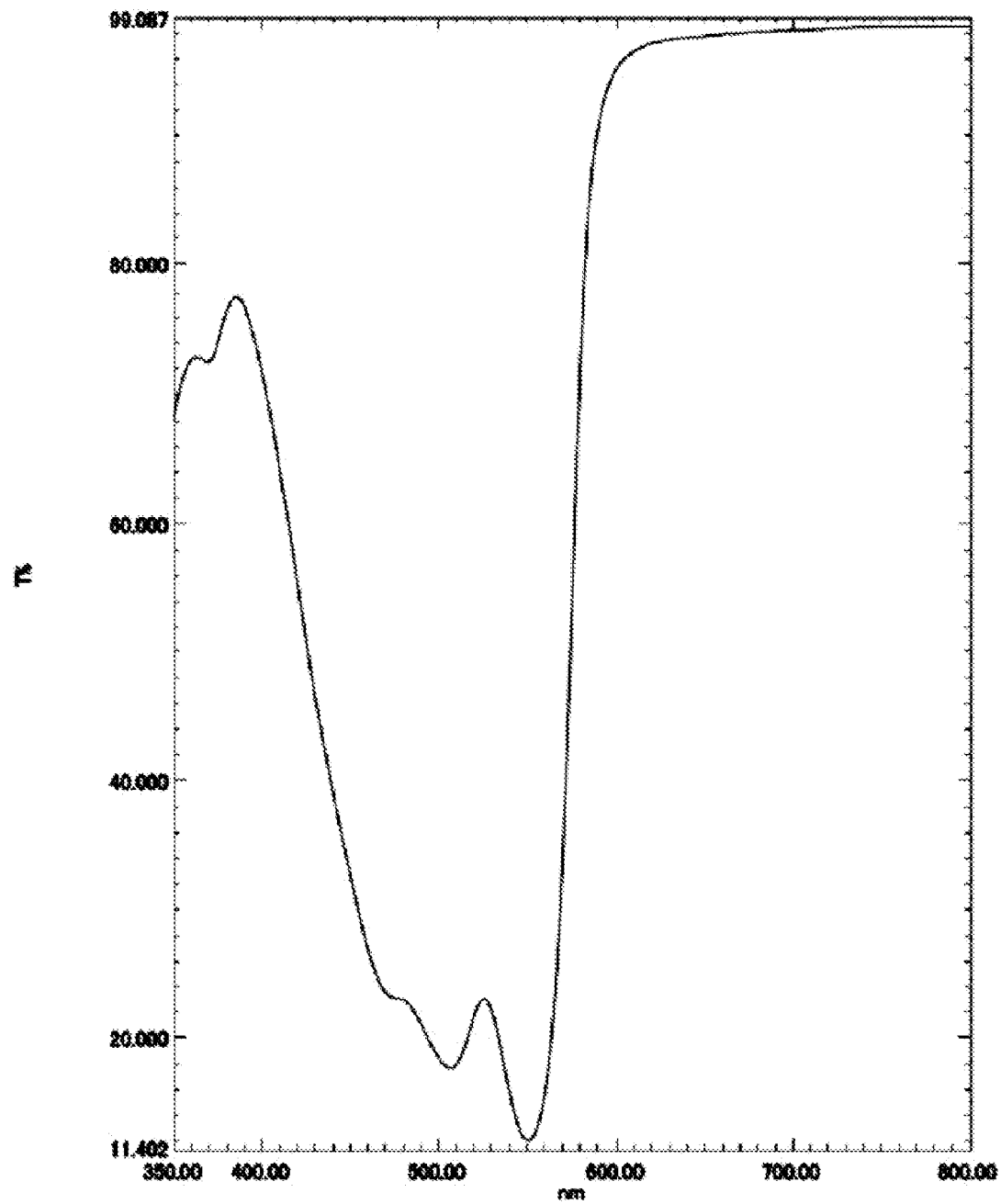
FIG. 7 is a transmission spectrum (wavelength region of 350 nm to 800 nm) of a dispersion solution of the α-type diketopyrrolopyrrole pigment nanoparticles (pigment concentration of 0.005% by weight) produced in Example 1-1.
Figure 8:
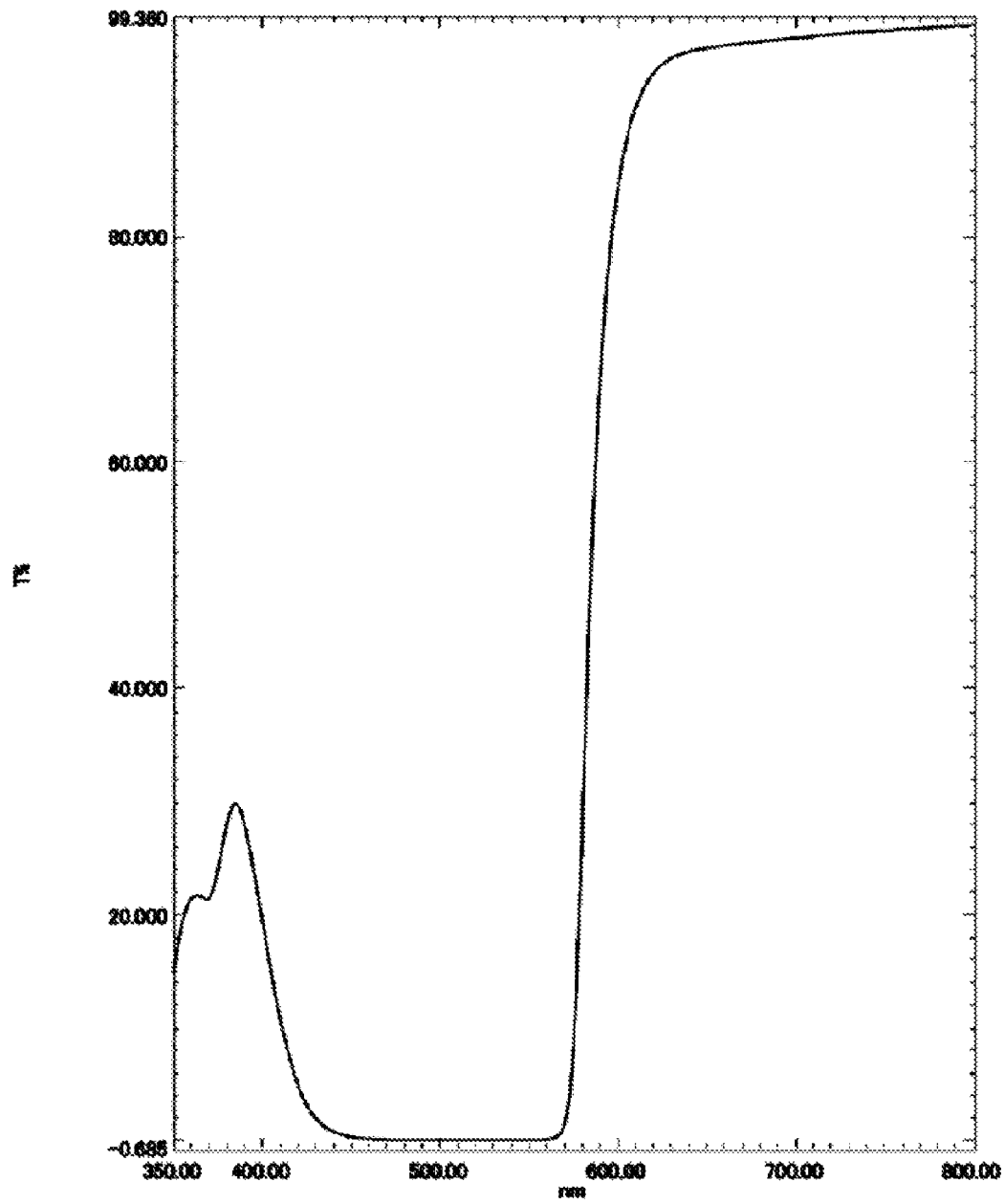
FIG. 8 is a transmission spectrum (wavelength region of 350 nm to 800 nm) of a dispersion solution of the α-type diketopyrrolopyrrole pigment nanoparticles (pigment concentration of 0.020% by weight) produced in Example 1-1.
Figure 9:
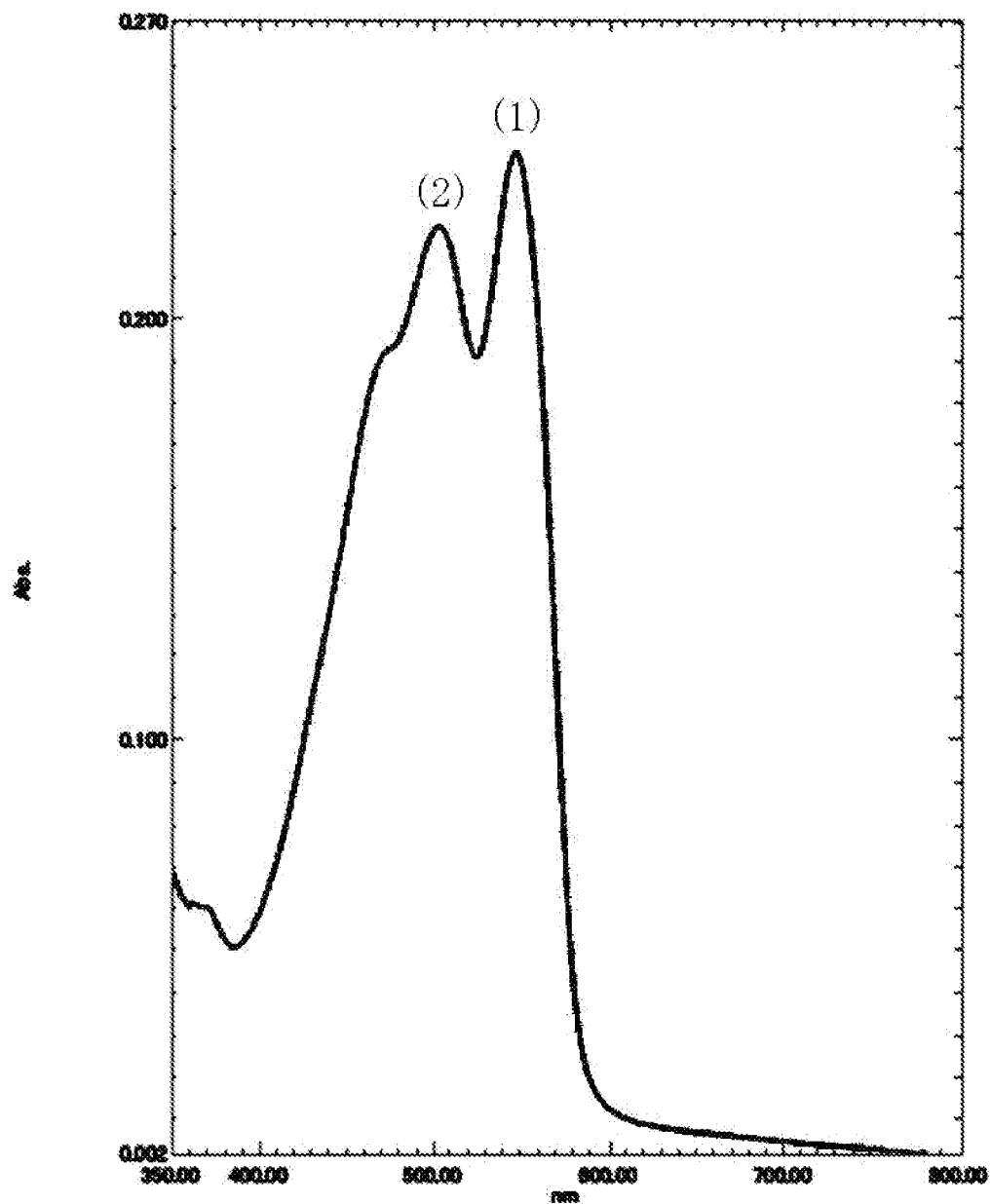
FIG. 9 is an absorption spectrum (wavelength region of 350 nm to 800 nm) of a dispersion solution of the α-type diketopyrrolopyrrole pigment nanoparticles (pigment concentration of 0.001% by weight) produced in Example 1-1.
Figure 10:
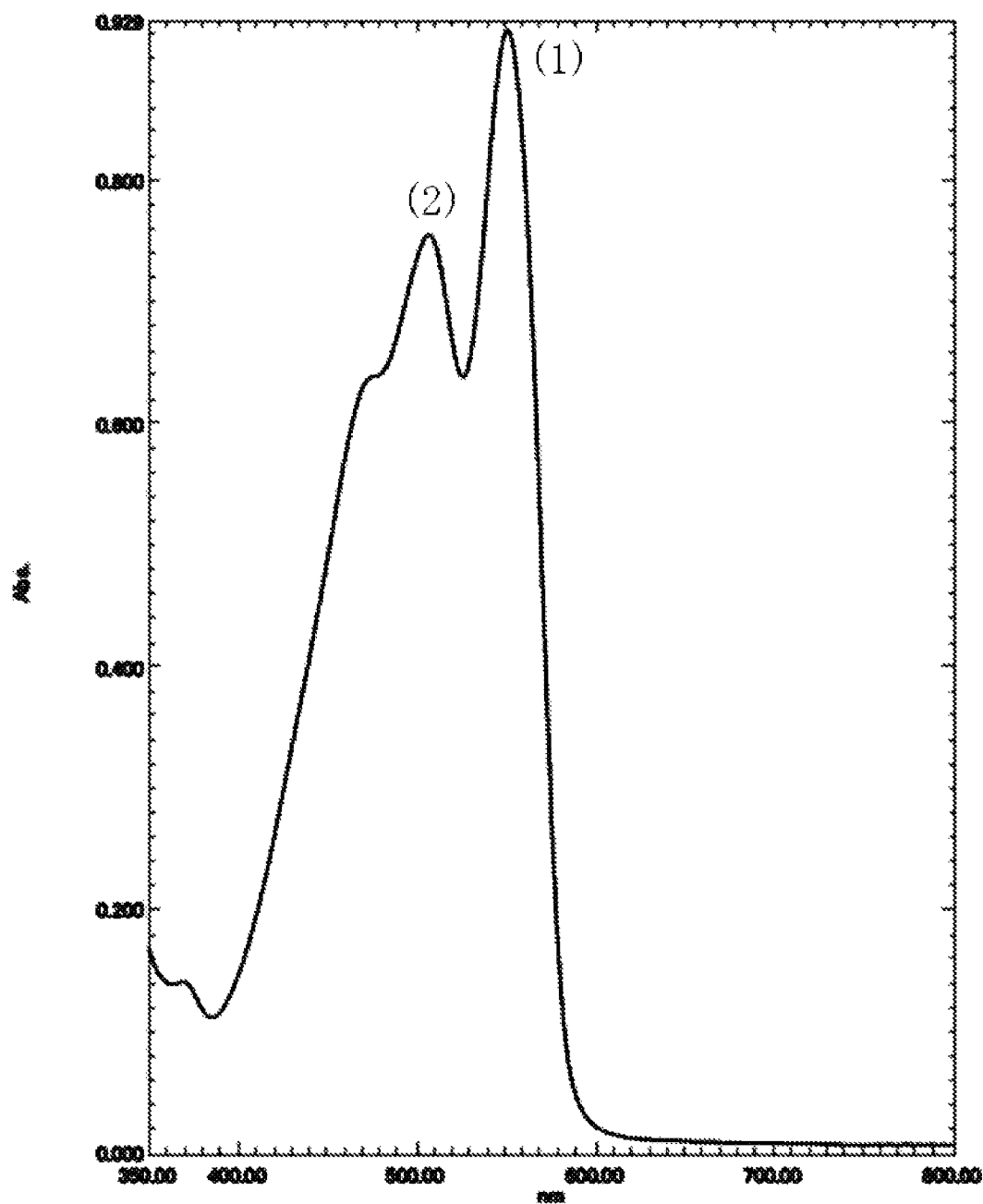
FIG. 10 is an absorption spectrum (wavelength region of 350 nm to 800 nm) of a dispersion solution of the α-type diketopyrrolopyrrole pigment nanoparticles (pigment concentration of 0.005% by weight) produced in Example 1-1.
Figure 11:
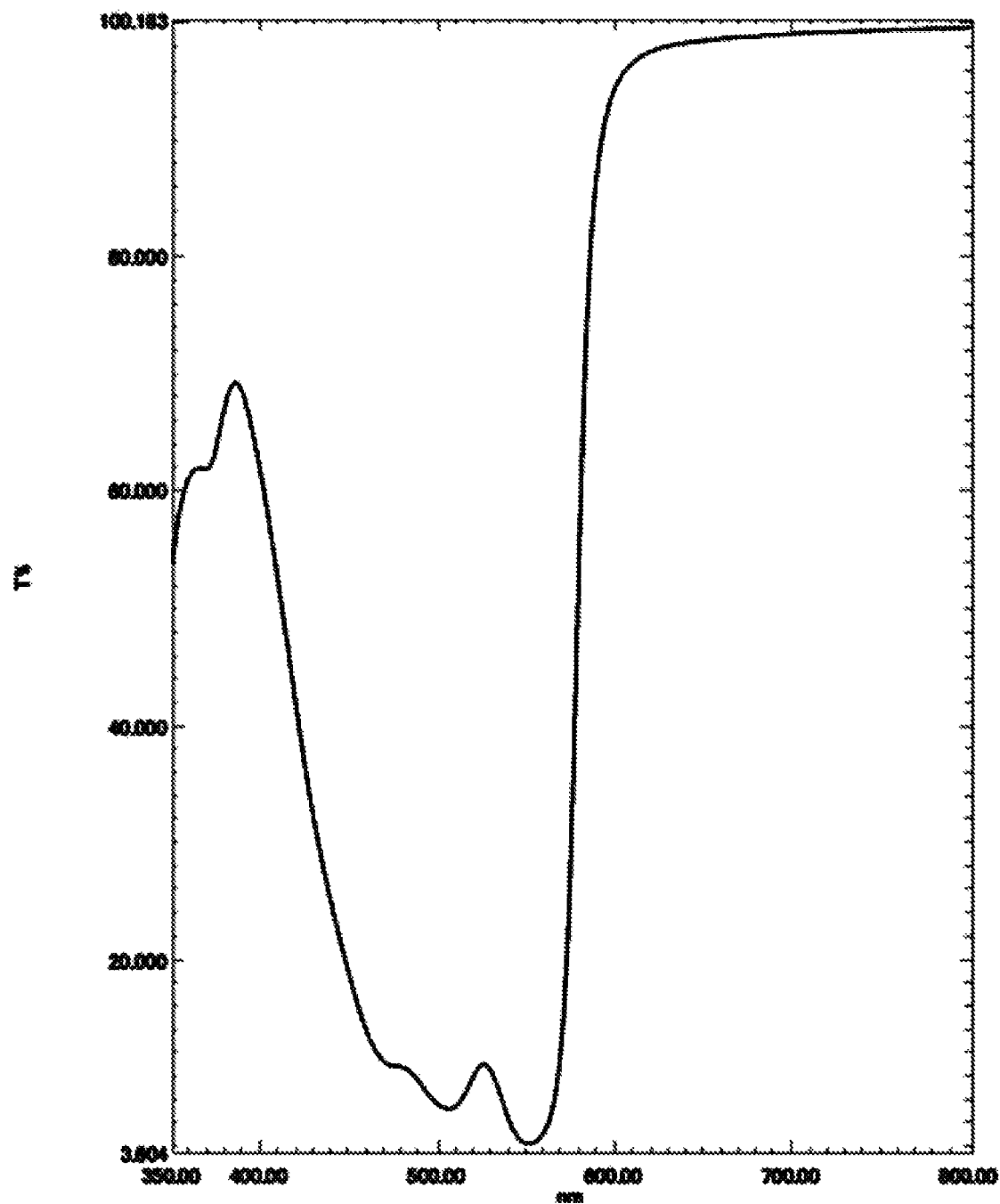
FIG. 11 is a transmission spectrum (wavelength region of 350 nm to 800 nm) of a dispersion solution of the α-type diketopyrrolopyrrole pigment nanoparticles (pigment concentration of 0.005% by weight) produced in Example 1-2.
Figure 12:
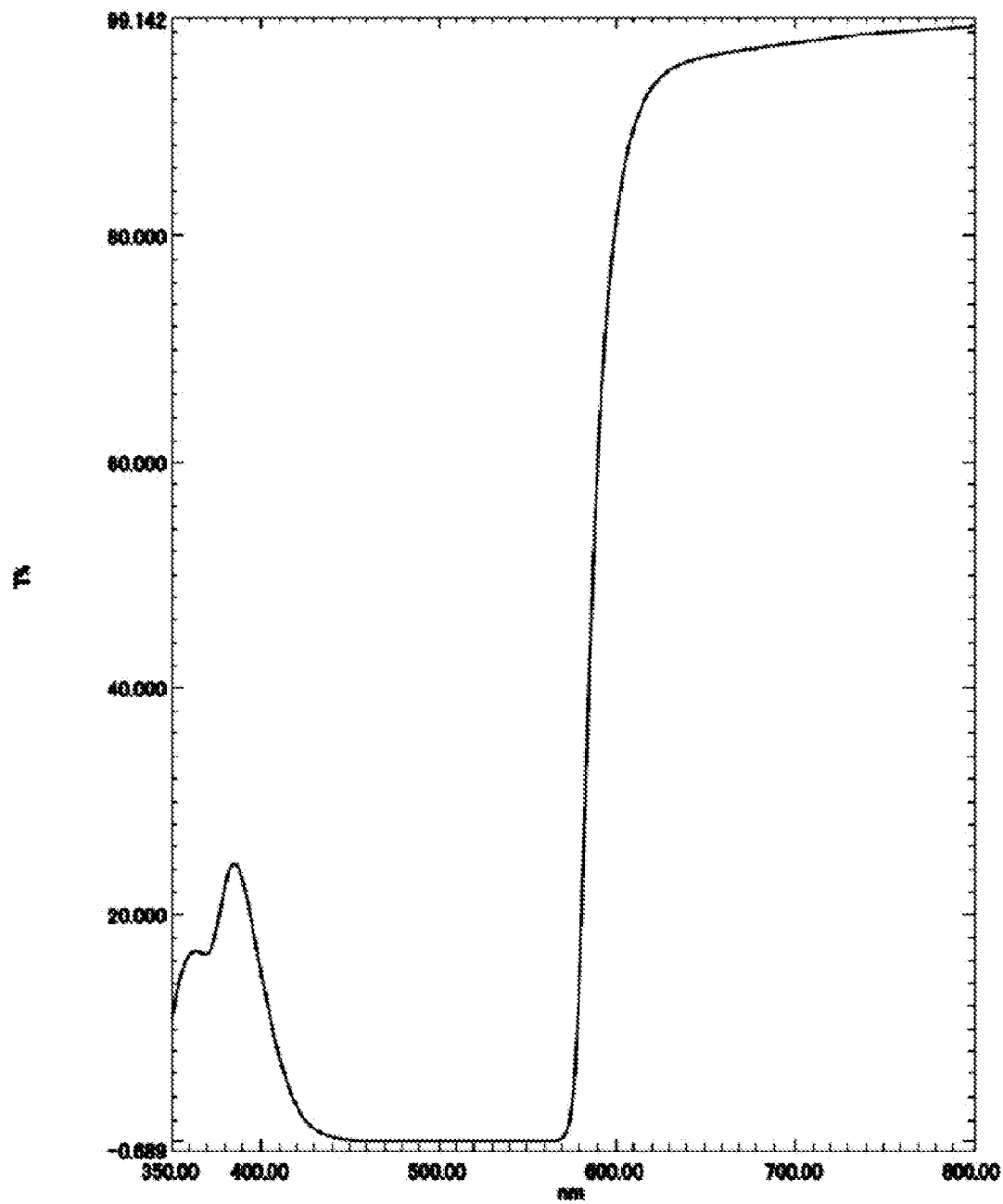
FIG. 12 is a transmission spectrum (wavelength region of 350 nm to 800 nm) of a dispersion solution of the α-type diketopyrrolopyrrole pigment nanoparticles (pigment concentration of 0.020% by weight) produced in Example 1-2.
Figure 13:
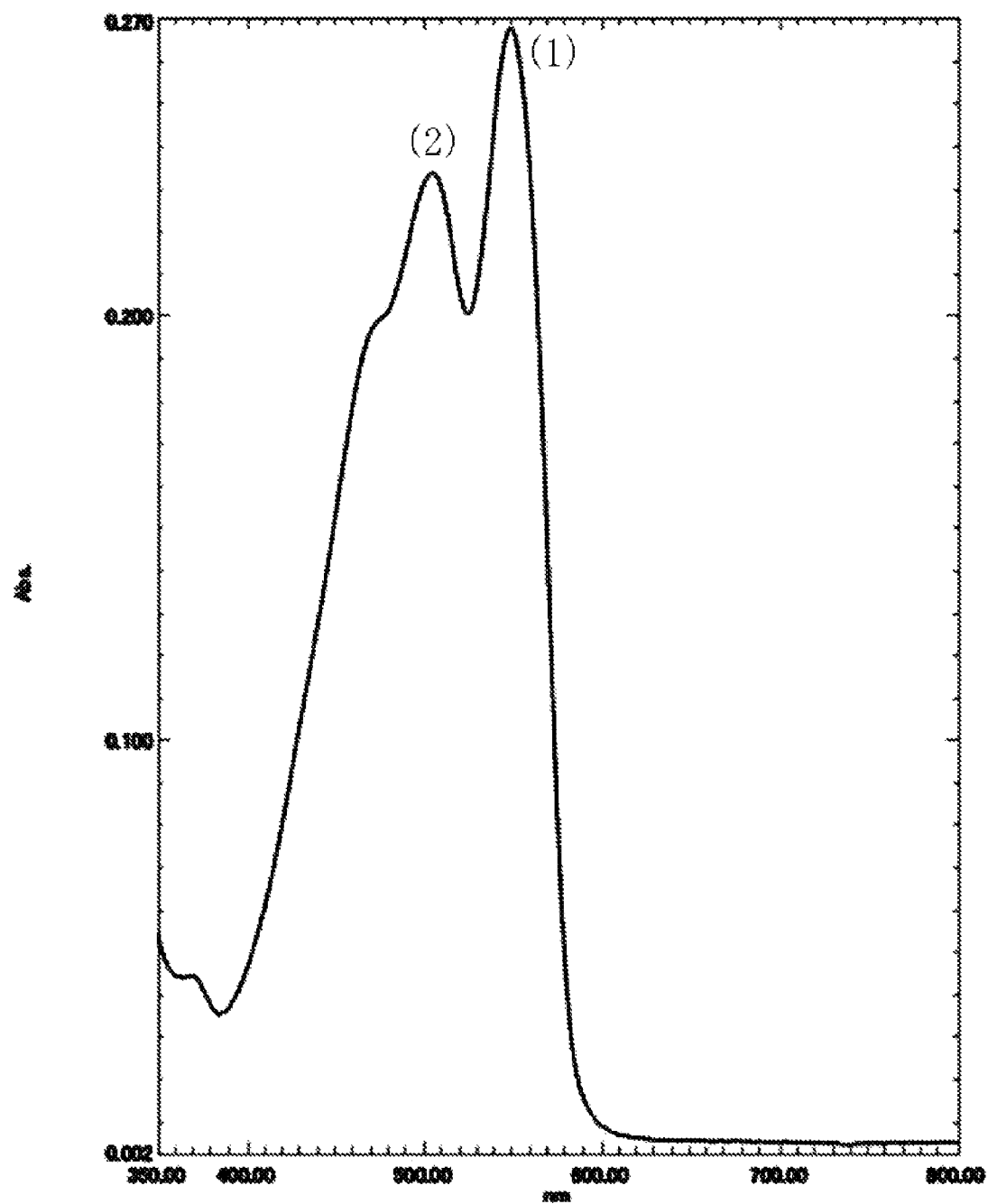
FIG. 13 is an absorption spectrum (wavelength region of 350 nm to 800 nm) of a dispersion solution of the α-type diketopyrrolopyrrole pigment nanoparticles (pigment concentration of 0.001% by weight) produced in Example 1-2.
Figure 14:
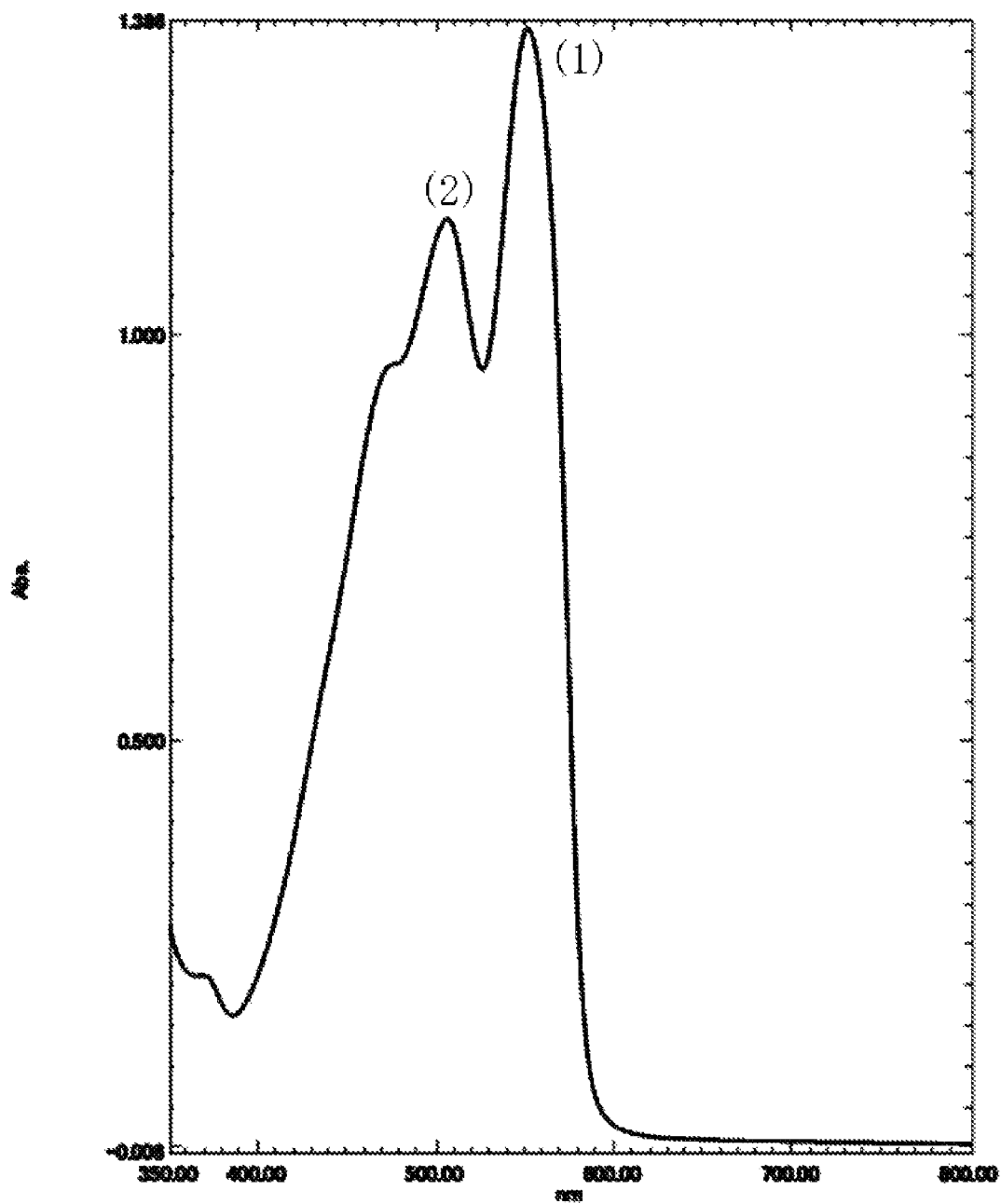
FIG. 14 is an absorption spectrum (wavelength region of 350 nm to 800 nm) of a dispersion solution of the α-type diketopyrrolopyrrole pigment nanoparticles (pigment concentration of 0.005% by weight) produced in Example 1-2.

XRD measurement results, together with pH after the discharge, and D50 and D90 in the particle size distribution measurement results after the dispersion treatment in the respective Examples and Comparative Examples are shown in FIG. 5. In FIG. 6, a TEM picture of the α-type diketopyrrolopyrrole pigment nanoparticles produced in Example 1-2 is shown. As shown in the drawings, it can be seen that the α-type diketopyrrolopyrrole pigment nanoparticles are produced in Examples 1-1, 1-2, and 1-3; but in Comparative Examples, it can be seen that a mixture of the α-type with other crystal type (β-type) is obtained, or the α-type is not produced. When comparison was made between Examples 1-1 and 1-2 with regard to D50 and D90 in the particle size distribution measurement results after the dispersion treatment, it can be seen that both D50 and D90 were smaller in Example 1-2, thereby confirming that a particle diameter of the α-type diketopyrrolopyrrole pigment nanoparticles could be easily controlled by changing the processing temperature, i.e., each temperature of sending fluids of the first fluid and the second fluid.

Further, transmission spectrum and absorption spectrum in the wavelength range of 350 nm to 800 nm were measured as to the dispersion solution of the α-type diketopyrrolopyrrole pigment nanoparticles after the dispersion treatment of the pigment nanoparticles obtained in Examples 1-1 and 1-2. In Table 1, pigment concentration of the pigment nanoparticles, and peak position and peak intensity in the absorption spectrum thereof are shown; and in FIG. 7 to FIG. 14, the transmission spectrum charts or the absorption spectrum charts in Examples 1-1 and 1-2 are shown. In FIG. 9 to FIG. 10 and FIG. 13 to FIG. 14, numerical references (1) and (2) were assigned to the respective peak positions confirmed from the longer wavelength side.

As shown in FIG. 7 to FIG. 14, similarly to the XRD measurement results, it can be seen that the α-type diketopyrrolopyrrole pigment nanoparticles are produced in Examples 1-1 and 1-2.

Example 2-1

By using the apparatus, as shown in FIG. 1, in which fluids are uniformly stirred and mixed in the thin film fluid formed between the processing surfaces 1 and 2 arranged to be opposite to each other so as to be able to approach to and separate from each other, at least one of which rotates relative to the other, a solution having a red pigment of C. I. Pigment RED 177 (hereinafter, PR-177) dissolved therein is converged with pure water in this thin film fluid, whereby they are mixed uniformly in the thin film fluid, and then PR-177 is separated.

(Temperature of Each Fluid)

Temperature of a first fluid was measured at the position just before the fluid is introduced into between the processing surfaces 1 and 2 of the fluid processing apparatus. Temperature of a second fluid was measured in a tank (for example, the tank T2 in FIG. 4) which was connected to the second introduction part d2 of the fluid processing apparatus and in which the second fluid was stored temporarily. Meanwhile, after separately confirming that the temperature of the fluid in the tank was the same as the temperature of the fluid just before introduction between the processing surfaces 1 and 2 (or more precisely, the temperature difference therebetween is in a level that both the temperatures may be judged same), the temperature measured in the tank was taken as the temperature of the second fluid.

(Volume-Average Particle Diameter)

Particle size distribution was measured by using a Nanotrac particle size distribution measurement instrument (UPA-EX150, manufactured by Nikkiso Co., Ltd.), and the volume-average particle diameter was taken.

A sulfuric acid solution of 3% PR-177 in which PR-177 was dissolved in sulfuric acid was introduced as a second fluid into between the processing surfaces 1 and 2 at a rate of 5 mL/minute, together with pure water as a first fluid from the center at supply pressure of 0.15 MPa, a rotation speed of 500 rpm, and a rate of 300 g/minute, to effect mixing of the two fluids. Nanoparticles of PR-177 in the discharged dispersion solution of PR-177 were aggregated loosely; and then, the resulting aggregated PR-177 nanoparticles were filtered by a filter paper and a nutsche, washed by pure water, and dried at 60° C. and −0.1 MPa. Drying was done until water content after drying reached 100 ppm or less to shorten the dispersion time and to keep the dispersion stably. Obtained dry powder

TABLE 1

Figure 15:
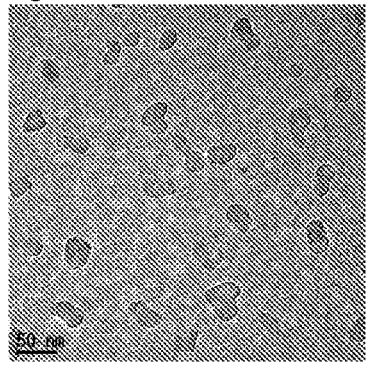
FIG. 15 is a TEM picture of the microparticles produced with the temperature of the first fluid being 5° C. and the second fluid being 5° C. (ΔT=0° C.) in Example 2-1.
Figure 16:
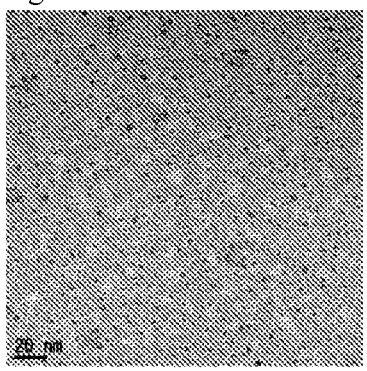
FIG. 16 is a TEM picture of the microparticles produced with the temperature of the first fluid being 5° C. and the second fluid being 25° C. (ΔT=20° C.) in Example 2-1.

| | | | Peak position and peak intensity in absorption spectrum | | | |
|---|---|---|---|---|---|---|
| | Pigment | Spectrum | (1) | | (2) | |
| Examples | concentration [% by weight] | Transmission/ Absorption | Wavelength [nm] | Absorbance | Wavelength [nm] | Absorbance |
| Example 1-1 | 0.005 | Transmission | — | — | — | — |
| | 0.020 | Transmission | — | — | — | — |
| | 0.001 | Absorption | 546 | 0.239 | 503 | 0.222 |
| | 0.005 | Absorption | 550 | 0.922 | 507 | 0.754 |
| Example 1-2 | 0.005 | Transmission | — | — | — | — |
| | 0.020 | Transmission | — | — | — | — |
| | 0.001 | Absorption | 549 | 0.268 | 505 | 0.234 |
| | 0.005 | Absorption | 551 | 1.377 | 506 | 1.142 | of PR-177 was charged into a solution of propylene glycol monomethyl ether acetate (PGMEA) containing 40%, as the active ingredient relative to the weight of PR-177 powders, of a dissolved dispersant (Disperbyk BYK-2000, manufactured by BYK-Chemie GmbH); and then, the resulting mixture was subjected to dispersion treatment by using CLEARMIX 0.8S (manufactured by M Technique Co., Ltd.). Temperature conditions of the first fluid and the second fluid and results of the particle size distribution of the finally obtained dispersion solution are shown in Table 2. The particle diameter of the nanoparticles obtained in each condition was confirmed by a transmission electron microscope (TEM); and as a result, it was confirmed that the particle diameter confirmed by the TEM picture was identical to the measurement result of the particle size distribution. The TEM picture of the nanoparticles obtained under the temperature conditions of 5° C. for the first fluid and 5° C. for the second fluid ($\Delta T=0°$ C.) is shown in FIG. 15, and the TEM picture of the nanoparticles obtained under the temperature conditions of 5° C. for the first fluid and 25° C. for the second fluid ($\Delta T=20°$ C.) is shown in FIG. 16, respectively.

between the processing surfaces 1 and 2 arranged to be opposite to each other so as to be able to approach to and separate from each other, at least one of which rotates relative to the other, a solution having benzbromarone dissolved therein is converged with pure water in this thin film fluid, whereby they are mixed uniformly in the thin film fluid, and then benzbromarone is separated. Benzbromarone is known as an antipodagric drug and a hyperuricemia remedy drug.

An ethanol solution in which benzbromarone and Tween 80 (dispersant) were dissolved with the concentrations thereof being 3% for benzbromarone and 0.1% for Tween 80 was introduced as a second fluid into between the processing surfaces 1 and 2 at a rate of 10 mL/minute, together with pure water as a first fluid from the center at supply pressure of 0.25 MPa, a rotation speed of 700 rpm, and a rate of 200 g/minute, whereby the two fluids were mixed. The dispersion solution of benzbromarone was discharged. Temperature conditions of the first fluid and the second fluid, and results of particle

TABLE 2

First fluid: pure water
Second fluid: sulfuric acid solution of 3% PR-177

| Rotation number [rpm] | First fluid flow rate [g/min] | Second fluid flow rate [mL/min] | First fluid Temperature T1 [° C.] | Second fluid Temperature T2 [° C.] | Temperature difference $\Delta T = T2 - T1$ | Volume-average particle diameter [nm] |
|---|---|---|---|---|---|---|
| 500 | 300 | 5 | 5 | 5 | 0 | 43.5 |
|  |  |  | 5 | 8 | 3 | 95.4 |
|  |  |  | 5 | 10 | 5 | 8.5 |
|  |  |  | 5 | 25 | 20 | 5.7 |
|  |  |  | 25 | 25 | 0 | 40.1 |

From the above Example, it was confirmed that ultrafine particles, especially nanoparticles having a particle diameter of 10 nm or less, could be produced when the temperature difference between the first fluid and the second fluid was made 5° C. or more. Specifically, it was confirmed from the TEM picture that uniform nanoparticles could be produced, and that extremely ultrafine particles could be produced, as can be seen from the results shown in Table 2.

Example 2-2

Figure 17:
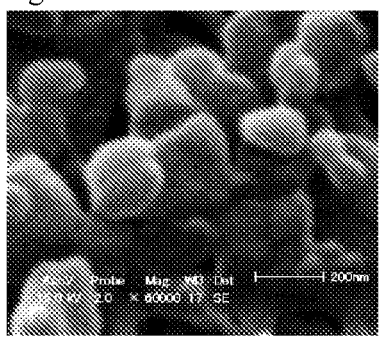
FIG. 17 is a SEM picture of the microparticles produced with the temperature of the first fluid being 25° C. and the second fluid being 25° C. (ΔT=0° C.) in Example 2-2.
Figure 18:
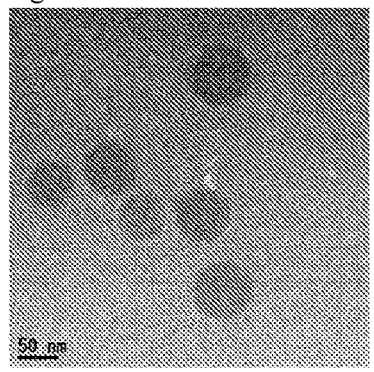
FIG. 18 is a TEM picture of the microparticles produced with the temperature of the first fluid being 5° C. and the second fluid being 35° C. (ΔT=30° C.) in Example 2-2.

By using the apparatus, as shown in FIG. 1, in which fluids are uniformly stirred and mixed in the thin film fluid formed size distribution of the obtained dispersion solution are shown in Table 3. The particle diameters of nanoparticles obtained in respective conditions were confirmed by a transmission electron microscope (TEM); it was confirmed that the particle diameter confirmed by the TEM picture was identical to the measurement result of the particle size distribution. The SEM picture of the nanoparticles obtained under the temperature conditions of 25° C. for the first fluid and 25° C. for the second fluid ($\Delta T=0°$ C.) is shown in FIG. 17; and the TEM picture of the nanoparticles obtained under the temperature conditions of 5° C. for the first fluid and 35° C. for the second fluid ($\Delta T=30°$ C.) is shown in FIG. 18, respectively.

TABLE 3

First fluid: pure water
Second fluid: ethanol solution of 3% benzbromarone/0.1% Tween 80

| Rotation number [rpm] | First fluid flow rate [g/min] | Second fluid flow rate [mL/min] | First fluid Temperature T1 [° C.] | Second fluid Temperature T2 [° C.] | Temperature difference $\Delta T = T2 - T1$ | Volume-average particle diameter [nm] |
|---|---|---|---|---|---|---|
| 700 | 200 | 10 | 5 | 8 | 3 | 204.6 |
|  |  |  | 5 | 10 | 5 | 51.3 |
|  |  |  | 5 | 35 | 30 | 58.6 |
|  |  |  | 25 | 25 | 0 | 208.4 |
|  |  |  | 5 | 5 | 0 | 229.3 |

From the above Example, it was confirmed that ultrafine particles, especially nanoparticles having a particle diameter of 100 nm or less, could be produced when the temperature difference between the first fluid and the second fluid was made 5° C. or more. Specifically, it was confirmed from the TEM picture that uniform nanoparticles could be produced, and that extremely ultrafine particles could be produced, as can be seen from the results shown in Table 3.

By using the apparatus, as shown in FIG. 1, in which fluids are uniformly stirred and mixed in the thin film fluid formed between the processing surfaces 1 and 2 arranged to be opposite to each other so as to be able to approach to and separate from each other, at least one of which rotates relative to the other, a solution having a microparticle material dissolved therein is converged with pure water or ethanol in this thin film fluid, whereby they are mixed uniformly in the thin film fluid, and then the nanoparticles are separated. As the microparticle materials, a red pigment of C. I. Pigment RED 177 (hereinafter PR-177), a cyan pigment of copper phthalocyanine, and an inorganic compound of ammonium molybdate were used.

(Temperature of Each Fluid)

Temperature of a first fluid was measured at the position just before the fluid is introduced into between the processing surfaces 1 and 2 of the fluid processing apparatus. Temperature of a second fluid was measured in a tank (see FIG. 4) which was connected to the second introduction part d2 of the fluid processing apparatus and in which the second fluid was stored temporarily. Meanwhile, after separately confirming that the temperature of the fluid in the tank was the same as the temperature of the fluid just before introduction between the processing surfaces 1 and 2 (or more precisely, the temperature difference therebetween is in a level that both the temperatures may be judged same), the temperature measured in the tank was taken as the temperature of the second fluid in this Example.

Example 3-1

A sulfuric acid solution of PR-177 in which PR-177 was dissolved in sulfuric acid was introduced as a second fluid into between the processing surfaces 1 and 2 at a rate of 5 mL/minute, together with pure water as a first fluid from the center at supply pressure of 0.15 MPa, a rotation speed of 500 rpm, and a rate of 300 g/minute, to effect mixing of the two fluids (dissolved concentration of PR-177 in the sulfuric acid solution was 15% relative to the saturated solubility thereof at each temperature). Nanoparticles of PR-177 in the discharged dispersion solution of PR-177 were aggregated loosely; and then, the resulting aggregated nanoparticles of PR-177 were filtered by a filter paper and a nutsche, washed by pure water, and dried at 60° C. and −0.1 MPa. Drying was done until water content after drying reached 100 ppm or less to shorten the dispersion time and keep the dispersion stably. Obtained dry powder of PR-177 was charged into a solution of propylene glycol monomethyl ether acetate (PGMEA) containing 40%, as the active ingredient relative to the weight of PR-177 powders, of a dissolved dispersant (Disperbyk BYK-2000, manufactured by BYK-Chemie GmbH); and then, the resulting mixture was subjected to dispersion treatment by using CLEARMIX 0.8S (manufactured by M Technique Co., Ltd.). Temperature conditions of the first fluid and the second fluid and results of the particle size distribution of the finally obtained dispersion solution are shown in Table 4 and FIG. 19. The particle diameter of the nanoparticles obtained in respective conditions was confirmed by a transmission electron microscope (TEM); and as a result, it was confirmed that the particle diameter confirmed by the TEM picture was identical to the measurement result of the particle size distribution.

TABLE 4

First fluid: pure water
Second fluid: sulfuric acid solution of PR-177

| Rotation number [rpm] | First fluid flow rate [g/min] | Second fluid flow rate [mL/min] | First fluid Temperature T1 [° C.] | Second fluid Temperature T2 [° C.] | Temperature difference $\Delta T = T2 - T1$ | Volume-average particle diameter [nm] |
|---|---|---|---|---|---|---|
| 500 | 300 | 5 | 5 | 5 | 0 | 38.1 |
|  |  |  | 5 | 8 | 3 | 22.3 |
|  |  |  | 5 | 10 | 5 | 16.4 |
|  |  |  | 5 | 15 | 10 | 13.2 |
|  |  |  | 5 | 25 | 20 | 10.6 |
|  |  |  | 5 | 50 | 45 | 9.5 |
|  |  |  | 5 | 75 | 70 | 7.1 |
|  |  |  | 50 | 35 | −15 | 65.5 |
|  |  |  | 15 | 10 | −5 | 45.6 |
|  |  |  | 25 | 15 | −10 | 52.2 |

(Volume-Average Particle Diameter)

Particle size distribution was measured by using a Nanotrac particle size distribution measurement instrument (UPA-EX150, manufactured by Nikkiso Co., Ltd.), and the volume-average particle diameter was taken.

(Saturated Solubility)

Saturated solubility was determined as following. Namely, a microparticle material was dissolved into a good solvent; and dissolved concentration thereof at the point where undissolved residue could be seen by visual observation was taken at each temperature.

Figure 19:
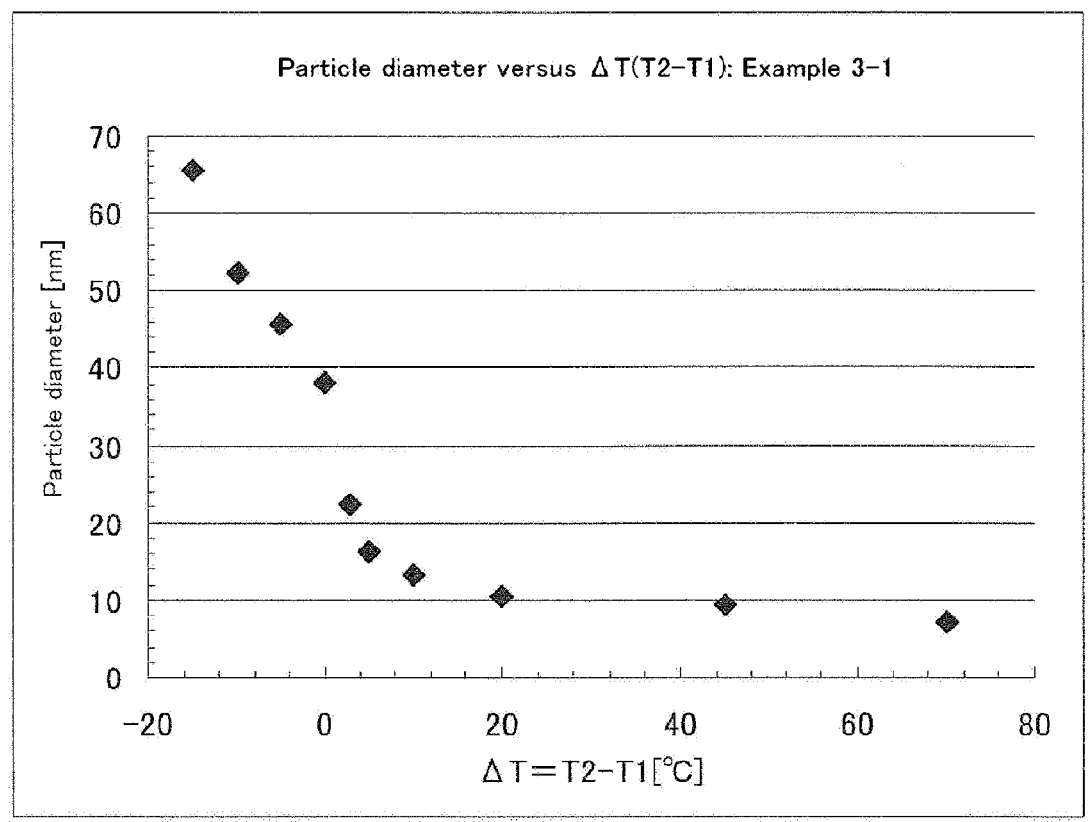
FIG. 19 is a graph showing the relationship between the temperature difference between the fluids and the particle diameter in Example 3-1.

In this Example, as shown in FIG. 19, it was confirmed that the particle diameter could be controlled by the temperature difference between the first fluid and the second fluid. It can be seen that correlation between the temperature difference and the particle diameter is obvious especially in the $\Delta T$ range of −15° C. to 20° C. It was further confirmed that fine nanoparticles can be obtained when $\Delta T$ is 5° C. or more.

Example 3-2

Figure 20:
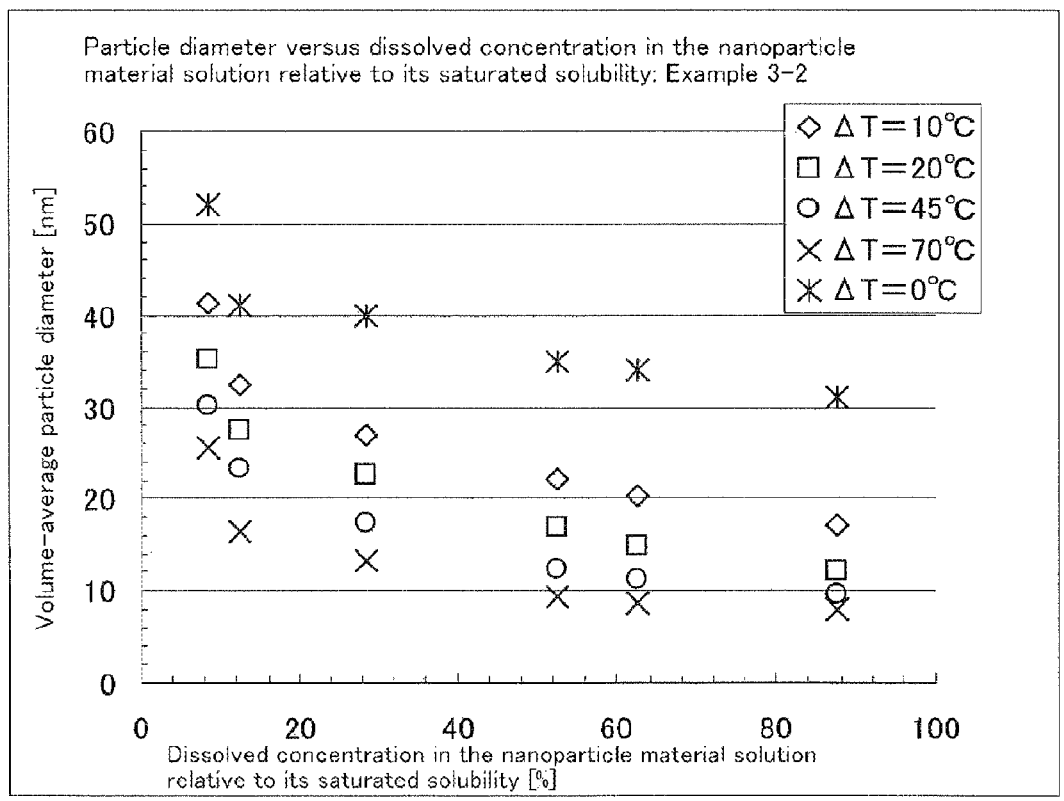
FIG. 20 is a graph showing the relationship between the dissolved concentration and the particle diameter in Example 3-2.

A sulfuric acid solution of copper phthalocyanine (hereinafter CuPc) in which copper phthalocyanine was dissolved in sulfuric acid was introduced as a second fluid into between the processing surfaces 1 and 2 at a rate of 5 mL/minute, together with pure water as a first fluid from the center at supply pressure of 0.15 MPa, a rotation speed of 500 rpm, and a rate of 300 g/minute, to effect mixing of the two fluids. Nanoparticles of copper phthalocyanine in the discharged dispersion solution of copper phthalocyanine were aggregated loosely; and then, the resulting aggregated nanoparticles of copper phthalocyanine were filtered by a filter paper and a nutsche, washed by pure water, and dried at 60° C. and −0.1 MPa. Drying was done until water content after drying reached 100 ppm or less to shorten the dispersion time and keep the dispersion stably. Obtained dry powder of copper phthalocyanine was charged into a solution of propylene glycol monomethyl ether acetate (PGMEA) containing 40%, as the active ingredient relative to the weight of copper phthalocyanine powders, of a dissolved dispersant (Disperbyk BYK-2000, manufactured by BYK-Chemie GmbH); and then, the resulting mixture was subjected to dispersion treatment by using CLEARMIX 0.8S (manufactured by M Technique Co., Ltd.). Temperature conditions of the first fluid and the second fluid and results of the particle size distribution of the finally obtained dispersion solution are shown in Table 5 and FIG. 20. The particle diameter of the nanoparticles obtained in respective conditions was confirmed by a transmission electron microscope (TEM); and as a result, it was confirmed that the particle diameter confirmed by the TEM picture was identical to the measurement result of the particle size distribution.

In this Example, it was confirmed that, in addition to the temperature difference between the first fluid and the second fluid, with higher concentration of the microparticle material in the microparticle material solution, the nanoparticles having a smaller particle diameter can be obtained, and that particle diameter thereof can be controlled by the temperature difference between the first fluid and the second fluid and concentration of the microparticle material.

Example 3-3

Figure 21:
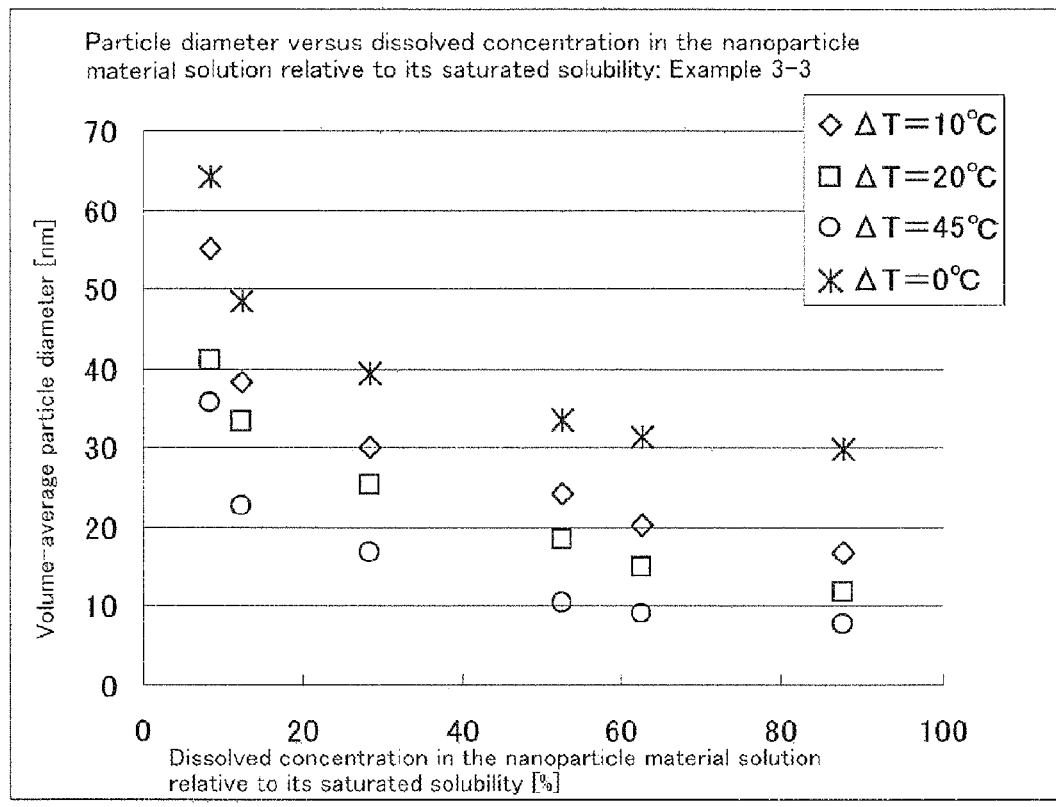
FIG. 21 is a graph showing the relationship between the dissolved concentration and the particle diameter in Example 3-3.

An ammonium molybdate aqueous solution was introduced as a second fluid into between the processing surfaces 1 and 2 at a rate of 3 mL/minute, together with ethanol as a first fluid from the center at supply pressure of 0.15 MPa, a rotation speed of 1000 rpm, and a rate of 100 g/minute, to effect mixing of the two fluids. Nanoparticles of ammonium molybdate in the discharged dispersion solution of ammonium molybdate were aggregated loosely; and then, the resulting aggregated nanoparticles of ammonium molybdate were filtered by a filter paper and a nutsche, washed by ethanol, and dried at 60° C. and −0.1 MPa. Evaluation of primary particles of the obtained nanoparticles was done based on the average particle diameter of 100 particles thereof observed by TEM at 500,000-fold magnification. Temperature conditions of the first fluid and the second fluid, concentration conditions, and average particle diameter obtained are shown in Table 6 and FIG. 21.

TABLE 5

First fluid: pure water
Second fluid: sulfuric acid solution of copper phthalocyanine

| Rotation number [rpm] | First fluid flow rate [g/min] | Second fluid flow rate [mL/min] | First fluid Temperature T1 [° C.] | Temperature T2 [° C.] | Second fluid Temperature difference ΔT = T2 − T1 | Dissolved Conc./Satd. Sol. × 100 [%] | Volume-average particle diameter [nm] |
|---|---|---|---|---|---|---|---|
| 500 | 300 | 5 | 5 | 15 | 10 | 8.5 | 41.2 |
|  |  |  |  |  |  | 12.5 | 32.4 |
|  |  |  |  |  |  | 28.5 | 26.9 |
|  |  |  |  |  |  | 52.5 | 22.1 |
|  |  |  |  |  |  | 62.5 | 20.4 |
|  |  |  |  |  |  | 87.5 | 17.2 |
|  |  | 5 | 5 | 25 | 20 | 8.5 | 35.2 |
|  |  |  |  |  |  | 12.5 | 27.4 |
|  |  |  |  |  |  | 28.5 | 22.6 |
|  |  |  |  |  |  | 52.5 | 16.9 |
|  |  |  |  |  |  | 62.5 | 14.9 |
|  |  |  |  |  |  | 87.5 | 12.1 |
|  |  | 5 | 5 | 50 | 45 | 8.5 | 30.1 |
|  |  |  |  |  |  | 12.5 | 23.2 |
|  |  |  |  |  |  | 28.5 | 17.3 |
|  |  |  |  |  |  | 52.5 | 12.4 |
|  |  |  |  |  |  | 62.5 | 11.2 |
|  |  |  |  |  |  | 87.5 | 9.5 |
|  |  | 5 | 5 | 75 | 70 | 8.5 | 25.6 |
|  |  |  |  |  |  | 12.5 | 16.4 |
|  |  |  |  |  |  | 28.5 | 13.2 |
|  |  |  |  |  |  | 52.5 | 9.4 |
|  |  |  |  |  |  | 62.5 | 8.6 |
|  |  |  |  |  |  | 87.5 | 7.9 |
|  |  | 5 | 5 | 5 | 0 | 8.5 | 52.1 |
|  |  |  |  |  |  | 12.5 | 41.1 |
|  |  |  |  |  |  | 28.5 | 39.9 |
|  |  |  |  |  |  | 52.5 | 34.8 |
|  |  |  |  |  |  | 62.5 | 34.1 |
|  |  |  |  |  |  | 87.5 | 31.1 |

TABLE 6

First fluid: ethanol
Second fluid: ammonium molybdate aqueous solution

| Rotation number [rpm] | First fluid flow rate [g/min] | Second fluid flow rate [mL/min] | First fluid Temperature T1 [°C.] | Second fluid Temperature T2 [°C.] | Temperature difference ΔT = T2 − T1 | Dissolved Conc./Satd. Sol. × 100 [%] | Volume-average particle diameter [nm] |
|---|---|---|---|---|---|---|---|
| 1000 | 100 | 3 | 5 | 15 | 10 | 8.5 | 55.2 |
|  |  |  |  |  |  | 12.5 | 38.4 |
|  |  |  |  |  |  | 28.5 | 30.2 |
|  |  |  |  |  |  | 52.5 | 24.1 |
|  |  |  |  |  |  | 62.5 | 20.1 |
|  |  |  |  |  |  | 87.5 | 16.8 |
|  |  |  | 5 | 25 | 20 | 8.5 | 41.1 |
|  |  |  |  |  |  | 12.5 | 33.2 |
|  |  |  |  |  |  | 28.5 | 25.4 |
|  |  |  |  |  |  | 52.5 | 18.4 |
|  |  |  |  |  |  | 62.5 | 14.8 |
|  |  |  |  |  |  | 87.5 | 11.6 |
|  |  |  | 5 | 50 | 45 | 8.5 | 35.6 |
|  |  |  |  |  |  | 12.5 | 22.5 |
|  |  |  |  |  |  | 28.5 | 16.8 |
|  |  |  |  |  |  | 52.5 | 10.4 |
|  |  |  |  |  |  | 62.5 | 9.1 |
|  |  |  |  |  |  | 87.5 | 7.6 |
|  |  |  | 5 | 5 | 0 | 8.5 | 64.1 |
|  |  |  |  |  |  | 12.5 | 48.5 |
|  |  |  |  |  |  | 28.5 | 39.4 |
|  |  |  |  |  |  | 52.5 | 33.6 |
|  |  |  |  |  |  | 62.5 | 31.4 |
|  |  |  |  |  |  | 87.5 | 29.9 |

In this Example, it was confirmed that, in addition to the temperature difference between the first fluid and the second fluid, with higher concentration of the microparticle material in the microparticle material solution, the nanoparticles having a smaller particle diameter can be obtained, and that particle diameter thereof can be controlled by the temperature difference between the first fluid and the second fluid and the nanoparticle's concentration.

EXPLANATION OF REFERENCE NUMERALS

1 first processing surface
2 second processing surface
10 first processing member
11 first holder
20 second processing member
21 second holder
d1 first introduction part
d2 second introduction part
d20 opening
p fluid pressure imparting mechanism

The invention claimed is:

1. A method for producing nanoparticles, the method comprising:
providing at least two processing surfaces arranged opposite to each other, the at least two processing surfaces being configured to be able to approach to and separate from each other, at least one of which rotating relative to the other;
providing at least two kinds of fluids to be processed, wherein, at least one of the at least two kinds of fluids is a diketopyrrolopyrrole pigment solution containing at least one kind of diketopyrrolopyrrole pigment dissolved in a solvent and at least one of the at least two kinds of fluids other than the above-mentioned is an alcohol solvent containing at least one kind of alcohol compound solvent; and
mixing the at least two kinds of fluids to be processed to separate the diketopyrrolopyrrole pigment thereby providing the method for producing the nanoparticles, wherein:
of the diketopyrrolopyrrole pigment solution and the alcohol solvent, at least any one of the fluids to be processed contains an acidic substance,
the diketopyrrolopyrrole pigment solution and the alcohol solvent are mixed in a thin film fluid formed between the at least two processing surfaces, thereby separating the diketopyrrolopyrrole pigment, and
a pH value of a mixed solution obtained by mixing the at least two kinds of fluids in the thin film fluid formed between the at least two processing surfaces is less than or equal to 7, so that substantially only α-type diketopyrrolopyrrole pigment nanoparticles are separated without substantially separating a β-type diketopyrrolopyrrole pigment.

2. A method for producing nanoparticles, the method comprising:
providing at least two processing surfaces arranged opposite to each other, the at least two processing surfaces being configured to be able to approach to and separate from each other, at least one of which rotating relative to the other;
providing at least three kinds of fluids to be processed, comprising a first fluid, a second fluid, and a third fluid,
wherein, the first fluid is a diketopyrrolopyrrole pigment solution containing at least one kind of diketopyrrolopyrrole pigment dissolved in a solvent, the second fluid is an alcohol solvent containing at least one kind of alcohol compound solvent, and the third fluid contains an acidic substance; and mixing the at least three kinds of fluids to be processed in a thin film fluid formed between the at least two processing surfaces, thereby separating the diketopyrrolopyrrole pigment, wherein a pH value of a mixed solution obtained by mixing the at least three kinds of fluids in the thin film fluid formed between the at least two processing surfaces is less than or equal to 7, so that substantially only α-type diketopyrrolopyrrole pigment nanoparticles are separated without substantially separating a β-type diketopyrrolopyrrole pigment.

3. The method for producing nanoparticles according to claim 1, wherein:

of the fluids to be processed, at least any one of the fluids is passed through between both the processing surfaces with forming the thin film fluid, wherein, the method comprises;

another separate introduction path independent of the flow path through which the said at least any one of the fluids is passed, and an opening leading to the separate introduction path and being arranged in at least any one of the two processing surfaces, wherein, at least one fluid other than the said at least any one of the fluids is introduced into between the processing surfaces from the opening so as to mix the entire fluids to be processed in the thin film fluid to effect the separation under a condition of a laminar flow in the thin film fluid.

4. The method for producing nanoparticles according to claim 1, wherein the method comprises:

a fluid pressure imparting mechanism for imparting pressure to a fluid to be processed, a first processing member provided with a first processing surface of the two processing surfaces and a second processing member provided with a second processing surface of the two processing surfaces, and a rotation drive mechanism for rotating these processing members relative to each other, wherein, of the first and second processing member, at least the second processing member is provided with a pressure-receiving surface, and at least part of the pressure-receiving surface is comprised of the second processing surface, wherein, this pressure-receiving surface receives pressure applied to the fluid to be processed by the fluid pressure imparting mechanism thereby generating force to move in the direction of separating the second processing surface from the first processing surface, wherein, a fluid to be processed containing any one of the diketopyrrolopyrrole pigment solution and the alcohol solvent is passed between the first processing surface and the second processing surface, whereby the fluid to be processed is passed through between the both processing surfaces with forming a thin film fluid, wherein, the method comprises:

another separate introduction path independent of the flow path through which the said at least any one of the fluids to be processed is passed, and at least one opening leading to the introduction path in at least any one of the first and second processing surfaces, wherein, a fluid to be processed containing any other one of the diketopyrrolopyrrole pigment solution and the alcohol solvent is introduced into between the both processing surfaces from the introduction path so that the fluids to be processed may be mixed in the thin film fluid formed between the both processing surfaces to separate under a condition of a laminar flow in the thin film fluid.

5. The method for producing nanoparticles according to claim 1, wherein a particle diameter of the separating diketopyrrolopyrrole pigment nanoparticles is controlled by controlling processing temperature of the fluid to be processed.

6. A method for producing nanoparticles, the method comprising:

providing at least two processing surfaces arranged opposite to each other, the at least two processing surfaces being configured to be able to approach to and separate from each other, at least one of which rotating relative to the other;

providing at least two kinds of fluids to be processed, wherein, at least one of the at least two kinds of fluids to be processed is a microparticle material solution that dissolves the microparticle material in a solvent capable of being a good solvent of the microparticle material and at least one of the at least two kinds of fluids to be processed other than the above microparticle material solution is a solvent capable of being a poor solvent of the microparticle material; and converging the microparticle material solution and the solvent capable of being a poor solvent in a thin film fluid formed between the at least two processing surfaces, thereby separating the nanoparticles, wherein, the nanoparticle material solution and the solvent capable of being a poor solvent have a temperature difference of 5° C. or more at least at the moment of the convergence, and wherein a pH value of a mixed solution obtained by mixing the at least two kinds of fluids in the thin film fluid formed between the at least two processing surfaces is less than or equal to 7, so that substantially only α-type diketopyrrolopyrrole pigment nanoparticles are separated without substantially separating a β-type diketopyrrolopyrrole pigment.

7. A method for producing nanoparticles, wherein: the method comprising:

providing at least two processing surfaces arranged opposite to each other, the at least two processing surfaces being configured to be able to approach to and separate from each other, at least one of which rotating relative to the other;

providing at least two kinds of fluids to be processed, wherein, at least one of the at least two kinds of fluids to be processed is a microparticle material solution that dissolves the microparticle material in a solvent capable of being a good solvent of the microparticle material and at least one of the at least two kinds of fluids to be processed other than the above microparticle material solution is a solvent capable of being a poor solvent of the microparticle material and converging the microparticle material solution and the solvent capable of being a poor solvent in a thin film fluid formed between the at least two processing surfaces, thereby separating the nanoparticles, wherein, a temperature difference between the microparticle material solution and the solvent capable of being a poor solvent is controlled by a temperature difference control mechanism, wherein, the respective fluids to be processed having the temperature difference thus controlled are introduced into between the processing surfaces, wherein, in the temperature difference control mechanism, at least one of the fluid to be processed is heated or cooled, and wherein a pH value of a mixed solution obtained by mixing the at least two kinds of fluids in the thin film fluid formed between the at least two processing surfaces is less than or equal to 7, so that substantially only α-type diketopyrrolopyrrole pigment nanoparticles are separated without substantially separating a β-type diketopyrrolopyrrole pigment.

8. The method for producing nanoparticles according to claim 2, wherein:

of the fluids to be processed, at least any one of the fluids is passed through between both the processing surfaces with forming the thin film fluid, wherein, the method comprises;

another separate introduction path independent of the flow path through which the said at least any one of the fluids is passed, and an opening leading to the separate introduction path and being arranged in at least any one of the two processing surfaces, wherein, at least one fluid other than the said at least any one of the fluids is introduced into between the processing surfaces from the opening so as to mix the entire fluids to be processed in the thin film fluid to effect the separation under a condition of a laminar flow in the thin film fluid.

9. The method for producing nanoparticles according to claim 2, wherein the method comprises:

a fluid pressure imparting mechanism for imparting pressure to a fluid to be processed, a first processing member provided with a first processing surface of the two processing surfaces and a second processing member provided with a second processing surface of the two processing surfaces, and a rotation drive mechanism for rotating these processing members relative to each other, wherein, of the first and second processing members, at least the second processing member is provided with a pressure-receiving surface, and at least part of the pressure-receiving surface is comprised of the second processing surface, wherein, this pressure-receiving surface receives pressure applied to the fluid to be processed by the fluid pressure imparting mechanism thereby generating force to move in the direction of separating the second processing surface from the first processing surface, wherein, a fluid to be processed containing any one of the diketopyrrolopyrrole pigment solution and the alcohol solvent is passed between the first processing surface and the second processing surface, whereby the fluid to be processed is passed through between the both processing surfaces with forming a thin film fluid, wherein, the method comprises:

another separate introduction path independent of the flow path through which the said at least any one of the fluids to be processed is passed, and at least one opening leading to the introduction path in at least any one of the first and second processing surfaces, wherein, a fluid to be processed containing any other one of the diketopyrrolopyrrole pigment solution and the alcohol solvent is introduced into between the both processing surfaces from the introduction path so that the fluids to be processed may be mixed in the thin film fluid formed between the both processing surfaces to separate under a condition of a laminar flow in the thin film fluid.

10. The method for producing nanoparticles according to claim 2, wherein a particle diameter of the separating diketopyrrolopyrrole pigment nanoparticles is controlled by controlling processing temperature of the fluid to be processed.

11. The method for producing nanoparticles according to claim 1, wherein the alcohol solvent contains at least 80% of the alcohol compound solvent.

* * * * *